US006831220B2

(12) United States Patent

Varme

(10) Patent No.: US 6,831,220 B2
(45) Date of Patent: Dec. 14, 2004

(54) SYSTEM FOR PLAYING MUSIC HAVING MULTI-COLORED MUSICAL NOTATION AND INSTRUMENTS

(75) Inventor: Byron K. Varme, Houston, TX (US)

(73) Assignee: Rainbow Music Corporation, Houston, TX (US)

( * ) Notice: Subject to any disclaimer, the term of this patent is extended or adjusted under 35 U.S.C. 154(b) by 0 days.

(21) Appl. No.: 10/702,282

(22) Filed: Nov. 6, 2003

(65) Prior Publication Data

US 2004/0074376 A1 Apr. 22, 2004

Related U.S. Application Data

(62) Division of application No. 09/828,306, filed on Apr. 6, 2001, now abandoned.

(60) Provisional application No. 60/195,588, filed on Apr. 6, 2000.

(51) Int. Cl.[7] .............................................. G09B 15/02

(52) U.S. Cl. .................................... 84/483.2; 84/464 R

(58) Field of Search ............................ 84/483.2, 464 R

(56) References Cited

U.S. PATENT DOCUMENTS

| | | | | |
|---|---|---|---|---|
| 1,045,021 | A | | 11/1912 | Hartman |
| 2,221,143 | A | | 11/1940 | Lang |
| 2,284,868 | A | | 6/1942 | Heaney |
| 2,347,950 | A | | 5/1944 | Huish |
| 2,807,183 | A | | 9/1957 | Ney |
| 3,430,530 | A | | 3/1969 | Grindinger |
| 3,554,074 | A | | 1/1971 | Rickey |
| 3,680,428 | A | | 8/1972 | Buckrucker et al. |
| 3,698,277 | A | | 10/1972 | Barra |
| 3,846,826 | A | | 11/1974 | Mueller |
| 4,080,867 | A | | 3/1978 | Ratanangsu |
| 4,510,840 | A | | 4/1985 | Inami et al. |
| 5,050,984 | A | | 9/1991 | Geshwind |
| 5,113,356 | A | | 5/1992 | Nickell et al. |
| 5,286,909 | A | | 2/1994 | Shibukawa |
| 5,496,179 | A | | 3/1996 | Hoffman |
| 5,574,238 | A | | 11/1996 | Mencher |
| 5,675,100 | A | | 10/1997 | Hewlett |
| 5,728,960 | A | | 3/1998 | Sitrick |
| 5,746,605 | A | | 5/1998 | Kennedy |
| 5,920,023 | A | | 7/1999 | Ravagni et al. |
| 5,945,618 | A | | 8/1999 | Bennett |
| 5,962,800 | A | | 10/1999 | Johnson et al. |
| 6,031,172 | A | | 2/2000 | Papadopoulos |
| 6,127,616 | A | | 10/2000 | Yu |
| 6,169,239 | B1 | * | 1/2001 | Aiardo ...................... 84/483.2 |
| 6,288,315 | B1 | | 9/2001 | Bennett |
| 6,407,323 | B1 | * | 6/2002 | Karapetian ................ 84/477 R |
| 6,411,289 | B1 | * | 6/2002 | Zimmerman ............. 715/500.1 |

FOREIGN PATENT DOCUMENTS

| | | | |
|---|---|---|---|
| WO | WO 81/00637 | A1 | 3/1981 |

OTHER PUBLICATIONS

Little Rhythm Maker Piano, as shown in *Toy Time 14A*:42.

* cited by examiner

*Primary Examiner*—Jeffrey W Donels

(74) *Attorney, Agent, or Firm*—Christensen O'Connor Johnson Kindness PLLC

(57) ABSTRACT

Disclosed is a system for colorizing music for converting black and white musical scores into colorized musical scores through the use of a method that can be implemented by a computer wherein each whole tone and half tone is assigned a unique color and pattern, respectively, using a septuary system of colors. The unique colors and patterns are applied to piano keyboards, keyboard guides and to other musical instruments. Colorized musical scores in standard format or, alternatively, in a linear format on one or more computer screens or special display devices are displayed for viewing by the musician. The musical instruments are colored according to the musical score notes to facilitate playing of music.

6 Claims, 22 Drawing Sheets

Fig.2.
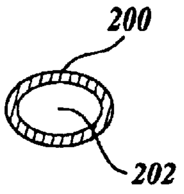
Fig.3.
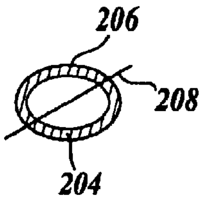
Fig.4.
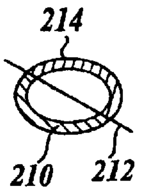
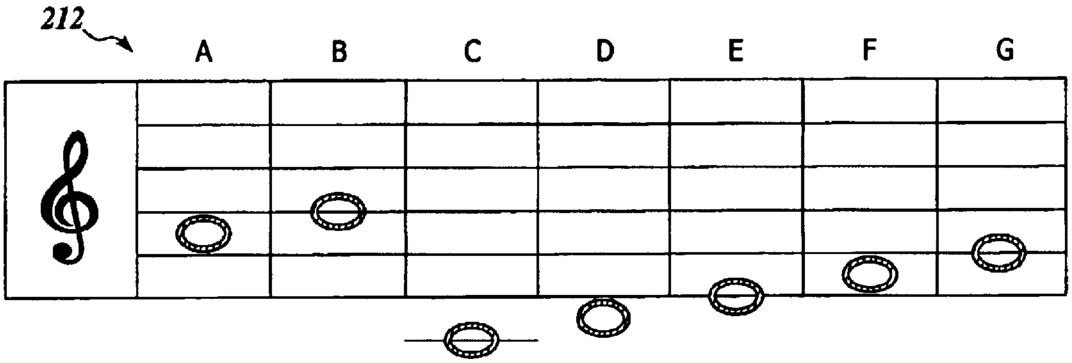
Fig.5.
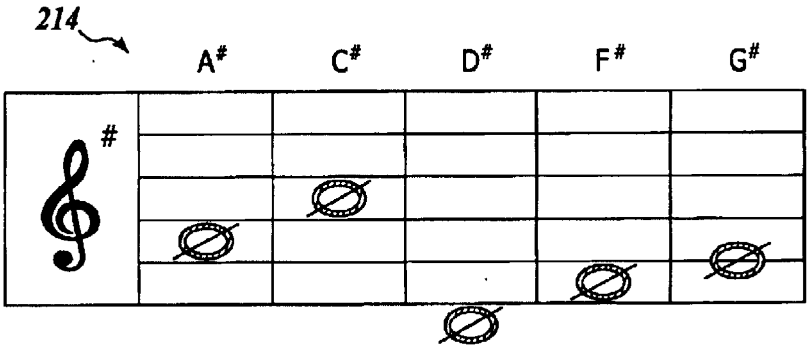
Fig.6.
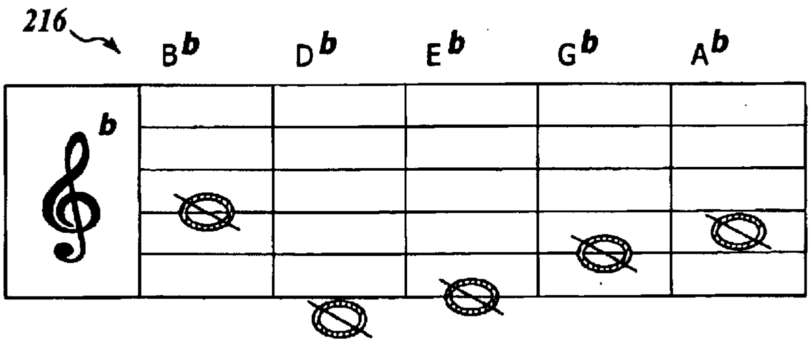
Fig.7.

Fig. 14.
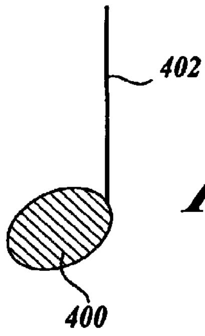
Fig. 15.
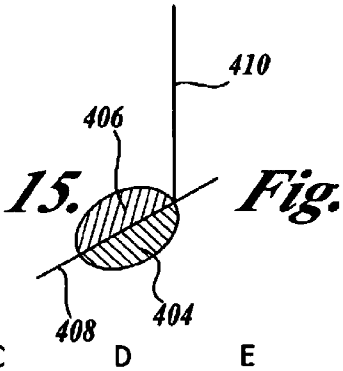
Fig. 16.
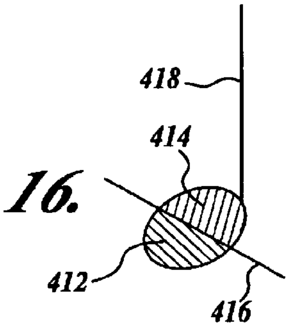
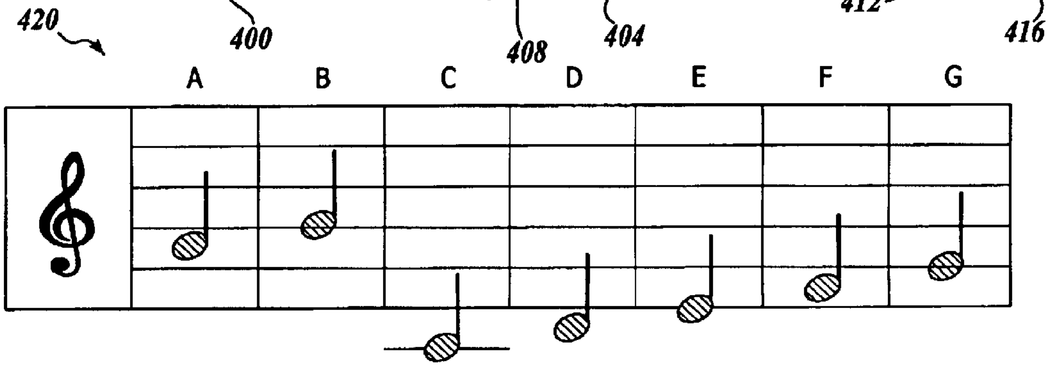
Fig. 17.
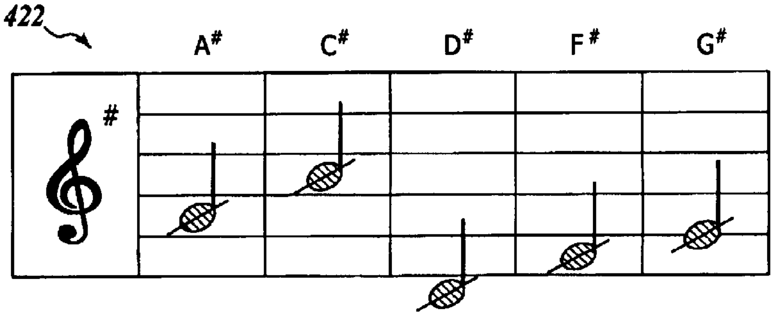
Fig. 18.
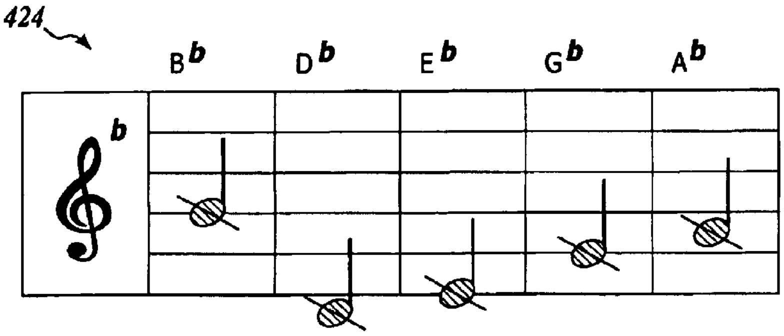
Fig. 19.

| KEY NO. TREBLE END | KEY LETTER | WHITE KEYS | BLACK KEYS LEFT | BLACK KEYS RIGHT |
|---|---|---|---|---|
| 52 | C | YELLOW | | |
| 51 | B | RED | | |
| 50 | A# or B b | | GREEN | RED |
| 49 | A | GREEN | | |
| 48 | G# or A b | | PURPLE | GREEN |
| 47 | G | PURPLE | | |
| 46 | F# or G b | | BLUE | GREEN |
| 45 | F | BLUE | | |
| 44 | E | ORANGE | | |
| 43 | D# or E b | | BROWN | ORANGE |
| 42 | D | BROWN | | |
| 41 | C# or D b | | YELLOW | BROWN |
| 40 | C | (MIDDLE C) | | |
| 39 | B | RED | | |
| 38 | A# or B b | | GREEN | RED |
| 37 | A | GREEN | | |
| 36 | G# or A b | | PURPLE | GREEN |
| 35 | G | PURPLE | | |
| 34 | F# or G b | | BLUE | PURPLE |
| 33 | F | BLUE | | |
| 32 | E | ORANGE | | |
| 31 | D# or E b | | BROWN | ORANGE |
| 30 | D | BROWN | | |
| 29 | C# or D b | | YELLOW | BROWN |
| 28 | C | YELLOW | | |
| 27 | B | RED | | |
| 26 | A# or B b | | GREEN | RED |
| 25 | A | GREEN | | |
| 24 | G# or A b | | PURPLE | GREEN |
| 23 | G | PURPLE | | |
| 22 | F# or G b | | BLUE | PURPLE |
| 21 | F | BLUE | | |
| 20 | E | ORANGE | | |
| 19 | D# or E b | | BROWN | ORANGE |
| 18 | D | BROWN | | |
| 17 | C# or D b | | YELLOW | BROWN |
| 16 | C | YELLOW | | |
| 15 | B | RED | | |
| 14 | A# or B b | | GREEN | RED |
| 13 | A | GREEN | | |
| 12 | G# or A b | | PURPLE | GREEN |
| 11 | G | PURPLE | | |
| 10 | F# or G b | | BLUE | PURPLE |
| 9 | F | BLUE | | |
| 8 | E | ORANGE | | |

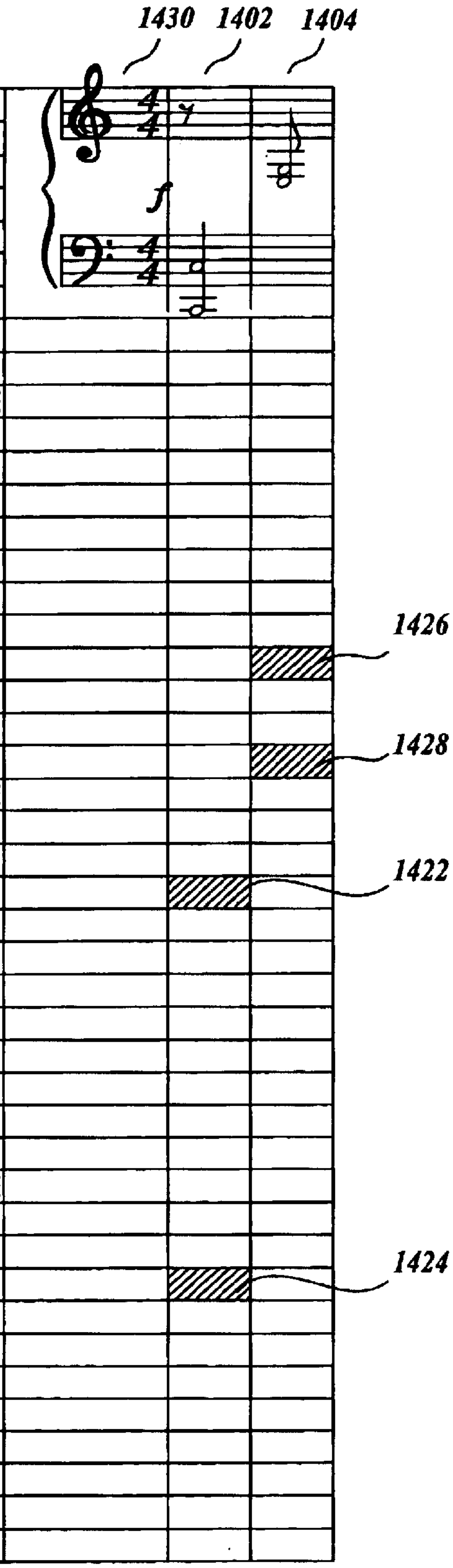

Fig. 30.

SYSTEM FOR PLAYING MUSIC HAVING MULTI-COLORED MUSICAL NOTATION AND INSTRUMENTS

CROSS-REFERENCES TO RELATED APPLICATIONS

This application is a divisional of U.S. application Ser. No. 09/828,306, filed on Apr. 6, 2001, now abandoned which claims the benefit of U.S. Provisional Patent Application No. 60/195,588, filed on Apr. 6, 2000.

FIELD OF THE INVENTION

The present invention relates to software, apparatus, and methods which create a system for converting back and white musical scores to colored musical scores that may be stored in a computer-readable medium, printed, electronically transmitted, and displayed in either a standard or linear format to correlate with colored keyboard instruments and other musical instrument overlays to facilitate and enhance a musical performance.

BACKGROUND OF THE INVENTION

The large number of musical scores composed in the past contain notes written in a standard musical notation format, and, are generally printed in black ink on white paper. These scores range from the simple to the extremely complex. Conventionally, the process of learning to read and play conventional music scores requires both students and teachers to devote considerable time and effort to learn both an archaic printed musical notation system having only black and white, and the location of the corresponding notes on a musical instrument. Music is also read like an English book, in a line from left to right, and top to bottom. Also, conventional keyboard instruments are almost always manufactured with only black and white keys.

Notes in the conventional music notation system are arranged into octaves, with each octave having seven whole tones or steps, and five half tones or half steps. Thus, in a musical composition, there are many tones or steps corresponding to printed notes. They range from low tones in the lower octaves of the bass clef, to high tones in the upper octaves of the treble clef. Conventional keys on a keyboard musical instruments are typically colored in black and white. White represents the whole tones A–G, and black represents the tones which are a half-tone, or half-step, up or down from the whole tones. Black and white keys only minimally distinguish between the different whole tones and half-tones of a musical composition. Much time and effort is therefore required to learn a note's location on a keyboard, or other musical instrument, and the corresponding note's location on a printed page.

Heretofore, no musical notation system has incorporated a colored musical notation system into a corresponding colored musical score and keyboard instrument. What is, therefore, needed is a new system to facilitate and enhance the process of learning to read musical notation and to associate the notes on a printed page with the location of notes on a musical instrument.

U.S. Pat. No. 2,221,143 to Lang purportedly discloses a system and apparatus for piano instruction having a colored board with a single color for each key. However, Lang fails to consider the half tones which lie between whole tones. Lang merely dismisses them and assigns a single color, failing to distinguish even the half tones from the whole tones.

U.S. Pat. No. 5,962,800 to Johnson et al. purportedly teaches a scale-based music notation system without the use of flats or sharps. However Johnson, as with Lang, failed to distinguish the half-tones from the whole tones through the use of a color selection scheme.

Further needs are to provide methods of converting old compositions from black and white into colorized musical score compositions utilizing a color notation system and systems and apparatus for correlating such colorized music scores to the notes on musical instruments.

Therefore, there is a need for a colored music notation system for writing and playing music that further includes apparatus and methods for converting black and white musical scores into colorized scores for printing, display, storage in a computer readable medium, or electronic transmission, that correlates with colored musical instrument overlays to facilitate and enhance a musical performance.

SUMMARY OF THE INVENTION

The present invention provides a musical notation system for creating colored music scores and colored musical instruments. The musical notation system according to the invention includes octaves, wherein the octaves include 12 tones. The 12 tones are divided into seven whole tones and five half tones. The half tones are a half step above and below whole tones. The seven whole tones include a color selected according to a master color matrix shown in Table A or Table B below, and the five half tones include a binary color set, wherein one color is selected according to the whole tone above the half tone, and the second color is selected according to the whole tone below the half tone. The colors for the half tones are selected according to either Table A or Table B.

In another embodiment, the musical notation system uses colors for the whole tones and the half tones only according to Table A.

In another embodiment of the present invention, the musical notation system uses colors for the whole tones and the half tones only according to Table B.

In another aspect of the present invention, a music score is provided. The music score includes notes which form a musical arrangement, wherein the notes representing whole tones and half tones are colored according to the musical notation system of the present invention. The colored notes are arranged on a staff. Optionally, the music score can omit the use of sharps, flats, or accidentals.

In another aspect of the present invention, a musical instrument is provided. The musical instrument includes a plurality of keys, wherein the keys define either a whole tone or a half tone and the keys include a color according to the music notation system of the present invention. The musical instrument further includes a container for holding the keys, such that the keys are arranged from the lowest to the highest tone. The musical instrument also includes means for sounding the whole notes and the half notes when the keys are played.

In another aspect of the present invention, a key overlay apparatus for colorizing a music instrument is provided. The overlay includes a sheet material having a first side and a back side, wherein the first side includes a colored area and the back side includes an applicator for applying the overlay to one or more keys of a musical instrument. The colored area is colored according to the musical notation system of the present invention. The overlay is applied so that the area is placed over a key, which defines a tone, and is matched to the color of the area.

In another aspect of the present invention, a music system is provided. The music system according to the present invention includes music scores wherein notes form an arrangement and the notes are colored in the music notation system according to the present invention. The music system includes a musical instrument having a plurality of keys for playing the whole tones and half tones, wherein the keys define either a whole tone or a half tone and the keys include a color according to the music notation system of the present invention. The musical instrument further includes a container for holding the keys from the lowest to the highest tone, and means for sounding the whole tones and the half tones when the keys are played.

In a further embodiment of the music system according to the present invention, an overlay device is provided. The overlay is positionable on a surface of one or more keys. The overlay includes a sheet material having a first and back side, wherein the first side includes a colored area and the back side includes an applicator. The colored area is colored according to the music notation system according to the present invention.

In yet another embodiment of the music system, a computer is provided to drive a display device capable of electronically displaying the colored music scores on a monitor, or a projector capable of projecting colored patterns corresponding to the notes being played on the musical instrument. The display can also include a monitor positionable on a music instrument.

In yet another embodiment of the music system according to the present invention, a student keyboard guide is provided which is capable of being positioned on the musical instrument adjacent the musical instrument keys. The student guide includes a graphical representation of the musical instrument keys, which are colored according to the music notation system of the present invention.

In yet another embodiment of the music system according to the present invention, an entertainment unit including a computer is provided. The entertainment unit provides a user with the ability to scan black and while music scores, print colorized music scores, save the colorized music scores, transfer the colorized music scores to a second computer, or edit the music scores. The entertainment unit can further include a speaker and a printer.

In yet another aspect of the present invention, a method for converting music having a plurality of staff rows, into linear music having a single staff row is provided. The method includes steps for (a) obtaining a plurality of data structures, wherein each data structure includes a key signature field operable to provide timing and key designations, and a plurality of measure fields operable to contain notes; (b) removing the redundant key signature fields from each of the data structures; and (c) combining the remaining measure fields to produce a linear music score. The step of obtaining data structures is carried out using a scanner.

In yet another embodiment, the method can include a further step of saving the measure fields in a new file or transferring the measure fields to display the fields as a linear musical score.

In yet another aspect of the present invention, a method implementable on a computer system for converting music having a plurality of staff rows, into linear music having a single staff row is provided. The method includes steps for: (a) obtaining a plurality of data structures, wherein each data structure includes a key signature field operable to provide timing and key designations, and a plurality of note fields operable to provide music notes; (b) removing the redundant key signature fields from each of the data structures; and (c) combining the measure fields to produce a linear music score.

In yet another aspect of the present invention, a method for transferring a computer program product from a first computer to a second computer connected to the first computer through a communications medium is provided. The method includes steps for: (a) accessing on a first computer, computer executable instructions for execution by a computer, the computer executable instructions for performing the method for converting music having a plurality of staff rows, into linear music having a single staff row; and (b) transferring the computer executable instructions from the first to the second computer.

In yet another embodiment of the present invention, a method for colorizing black and white musical scores into multi-colored musical scores is provided. The method includes steps for (a) obtaining a first data structure, wherein the data structure includes a plurality of note fields operable to contain a black and white note; (b) obtaining a second data structure, wherein the data structure includes a second note field operable to contain notes, a color field operable to be matched with the notes, and a pattern field operable to be matched with the notes; (c) matching the black and white note with the color field and the pattern field using the second note field; and (d) creating a third data structure, wherein the data structure includes a plurality of note fields operable to contain the newly colored and patterned note according to either Table A or B. In yet another embodiment, the first and the second data structure includes an octave field operable to be matched with the first and second note field to provide color and patterned notes for a plurality of octaves, colored according to Table A or B.

In yet another aspect of the present invention, a method implementable on a computer system for colorizing black and white musical scores into multi-colored musical scores is provided. The method includes steps for: (a) obtaining a first data structure, wherein the data structure includes a plurality of note fields operable to contain a black and white note; (b) obtaining a second data structure, wherein the data structure includes a second note field operable to contain notes, a color field operable to be matched with the notes, and a pattern field operable to be matched with the notes; (c) matching the black and white note with the color field and the pattern field using the second note field; and (d) creating a third data structure, wherein the data structure includes a plurality of note fields operable to contain a colored and patterned note according to Table A or B.

In yet another aspect of the present invention, a method for transferring a computer program product from a first computer to a second computer connected to the first computer through a communications medium is provided. The method includes steps for: (a) accessing on a first computer, computer executable instructions for execution by a computer, the computer executable instructions for performing the methods for colorizing black and white musical scores into multi-colored musical scores according to the present invention, and (b) transferring the computer executable instructions from the first to the second computer.

In yet another aspect of the present invention, a colorization routine for colorizing a black and white musical score into multi-colored musical score is provided. The method includes a step for scanning a raster image containing black and white notes. A step for obtaining the raw data containing the black and white note. A step which searches for note recognition. A step which creates note coordinates. A step which matches the note coordinates with a note database. A step which creates a note index in x, y, and z coordinates to color and pattern the note. A step to write the file, and a step to create a new raster image.

The present invention provides numerous advantages. The new musical notation system according to the invention provides more colors that can accelerate the music learning and playing process. The present invention provides for the use of a septuary method for writing and playing music, with each of the whole tones or steps being represented by a different color and the half tones or half steps being represented by a set of two colors, selected from the whole tone above and the whole tone below the half tone. Thus, an additional advantage provided by the present invention is the elimination of sharp or flat symbols adjacent to any notes. This is a simpler system of musical notation than the conventional black and white system which utilizes key signatures with sharps and flats.

The present invention further provides for retrofitting the keyboards of conventional music instruments with uniquely colored overlays to provide a correlation between the colored musical notation and the instrument. This system facilitates the learning and playing process since it makes both locating a particular key on a musical instrument easier, and also provides additional reference points for reading printed or displayed musical scores. This makes the reading process easier and faster as well. Thus, an additional advantage provided by the present invention is facilitating the playing of an instrument without music since a musician can play by employing basic music theory concepts such as by locating certain chords, or notes of chords, by reference to the colored instrument keys.

The present invention also fills the current demand for the rapid dissemination of information, since the new system according to the invention allows colorized music scores to be both printed on paper or saved in a computer-readable medium such as a compact disk or other digital media. This archival process is beneficial so that the new colorized music scores may also be displayed on video display monitors and transmitted over communication systems, such as the Internet, where end users may access the colorized compositions and download the colorized musical compositions on a home desktop or laptop computer.

Finally, the invention increases the enjoyment associated with learning and playing music by adding and using the element of color and, optimally, by the unique colored light displays correlated to the color musical notation system.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 2 is a schematic illustration of a whole note according to the present invention;

FIG. 3 is a sharp whole note according to the present invention;

FIG. 4 is a flat whole note according to the present invention;

FIG. 5 is a schematic illustration of the whole notes for the color music notation system according to the present invention;

FIG. 6 is a schematic illustration of sharp whole notes for the color music notation system according to the present invention;

FIG. 7 is a schematic illustration of flat whole notes for the color music notation system according to the present invention;

FIG. 14 is a schematic illustration of a quarter note according to the present invention;

FIG. 15 is a schematic illustration of a sharp quarter note according to the present invention;

FIG. 16 is a schematic illustration of a flat quarter note according to the present invention;

FIG. 17 is a schematic illustration of the quarter notes for the color music notation system according to the present invention;

FIG. 18 is a schematic illustration of the sharp quarter notes for the color music notation system according to the present invention;

FIG. 19 is a schematic illustration of the flat quarter notes for the color music notation system according to the present invention;

FIG. 30 is a schematic illustration of a colorization method according to the present invention;

DETAILED DESCRIPTION OF THE PREFERRED EMBODIMENT

As used herein tones refer to the sounds produced by musical instruments, notes are the graphical representation of tones on a printed page, for example. Keys are the components of a musical instrument to play the tones or notes. Whole tones are distinguishable from whole notes in that the latter refer to temporal qualities. Half tones are likewise distinguishable from half notes in that the latter refer to temporal qualities. Steps is used interchangeably with tones.

Figure 1:
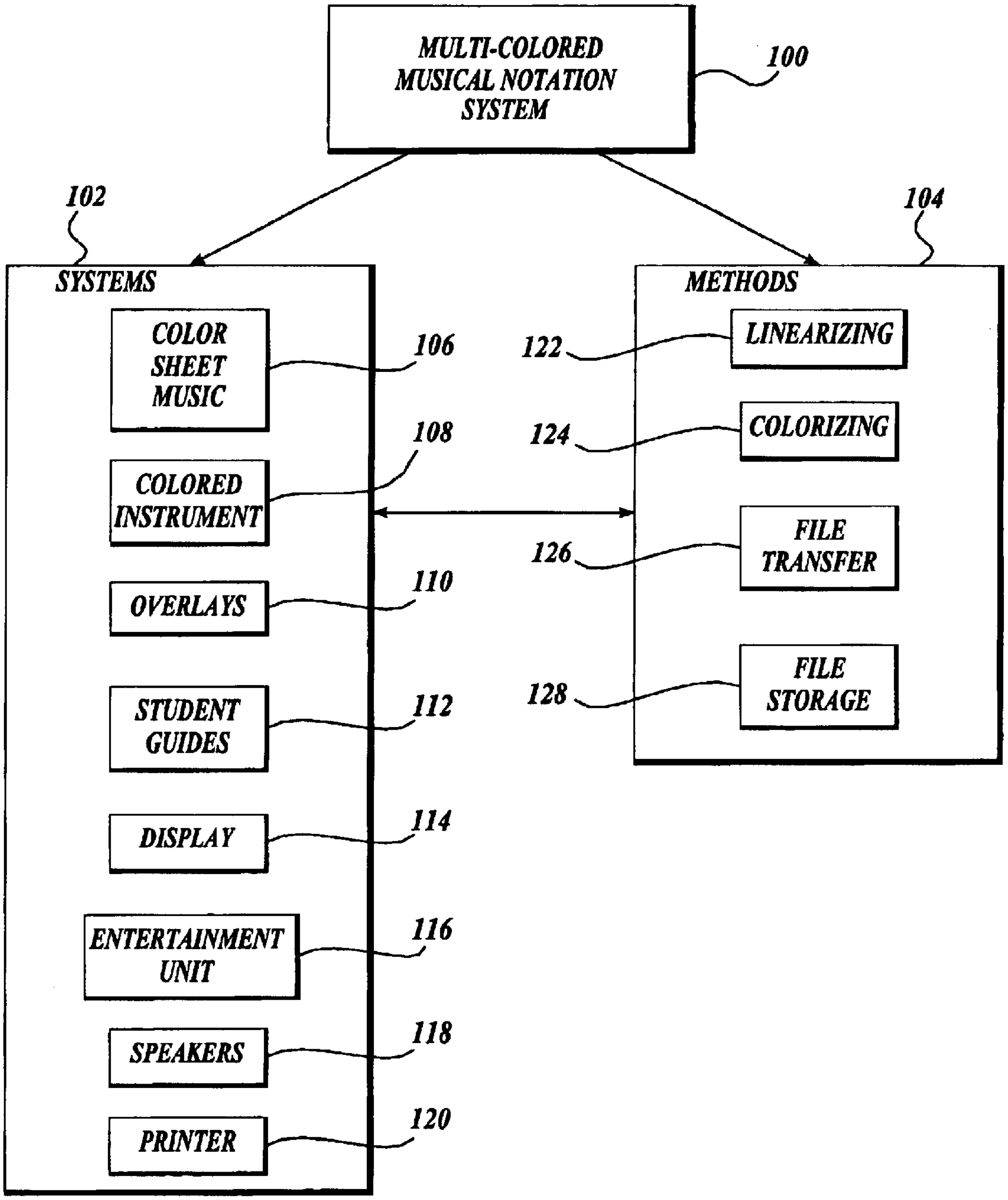
FIG. 1 is a schematic illustration of a multi-colored musical notation system, systems apparatus, and methods according to the present invention.

FIG. 1 is a schematic illustration of the present invention. The present invention includes a multi-colored musical notation system 100, system apparatus 102 utilizing the colored music notation 100, and methods 104 to manipulate data structures through routines capable of transforming the colored music notation into forms capable of being used by the system apparatus 102. A system apparatus according to the present invention can include one or more of the following in addition to the system of multi-colored musical notation: colored sheet music 106, colored instruments 108, overlays 110, display devices 114, such as monitors and projectors, student guides 112, entertainment units 116, speakers 118 and printers 120. Methods according to the present invention in addition to including a multi-colored musical notation system and method, include methods for linearizing bars of Grand staffed sheet music into a single Grand staff format 122, a method for colorizing conventional black and white music into a colorized music utilizing the multi-colored musical notation 124, a method of file transfer containing the multi-colored musical notation 126, and a method of file storage containing the multi-colored musical notation 128.

Multi-Colored Musical Notation

Referring now to FIGS. 2–19, a colorized musical notation system, composed of octaves, wherein each octave has twelve tones or steps according to the present invention, is illustrated. In conventional music notation an octave includes the following 12 tones: A, (A# or B♭), B, C, (C# or D♭), D, (D# or E♭), E, F, (F# or G♭), G, (G# or A♭). In the present invention, a color musical notation system has been developed that associates a distinctive color for each of the twelve tones of an octave and a distinctive shape for the corresponding notes.

The colorized musical notation system provides a set of optimum colors and patterns for the notes of musical scores and specifies that the same colors be used for the corresponding keys on a musical instrument, for colored overlays, electronic displays, and student guides for musical instruments. Each note designation of the twelve tones in an octave described above is assigned a distinctive color in accordance with the master color matrices as shown in Tables A and B. In one embodiment, the same set of colors is used for every octave regardless of whether the notes appear in the bass or treble clefs. In a second embodiment, different sets of seven colors is used for the notes in every octave in the bass and treble clefs. The colors of the currently preferred embodiment have been specifically chosen for their contrast to enhance, facilitate, and optimize note recognition and positive psychological impact.

The invention includes seven distinguishable colors chosen for their contrast for the seven whole tones, A, B, C, D, E, F and G used in musical notation. The sharp and flat tones of a musical score, (A# or B♭), (C# or D♭), (D# or E♭), (F# or G♭), (G# or A♭), will appear as a set of two colors, the color selected for the half tone's named whole tone and the color selected for the next higher whole tone for sharps and the next lower whole tone for flats. A suitable selection of colors is shown in Tables A and B below. However, variations of these colors, such as brighter or softer shades or tones, are suitable for use in the present invention. The colors chosen will facilitate recognition between the different notes on a score and the different keys on the instrument. In one embodiment of the musical notation system, it will be unnecessary to use sharps or flats next to a note, because the binary color set for half tones will make the notes easily recognizable as half tones.

The musical notation system according to the present invention will now be described with reference to FIGS. 2–19. In this embodiment of the present invention, preferably, standard notation marks, such as rests and other time duration designators are retained. Whole notes, half notes and quarter notes also serve as temporal designators as in standard notation and are indicated by the specific design for each type of note.

Referring to FIGS. 2–7, whole notes according to the present invention are illustrated. Referring specifically to FIG. 2, a whole note is an oval with a hollow center 202 and a colored oval band 200 colored according to the master color matrices of Table A and B. The band 200 is surrounded on both the inside and outside perimeters by a border. Referring to FIG. 5, a representative example of the whole notes for the seven whole tones are illustrated on a five line staff 212. Referring to FIGS. 3 and 4, a sharp and flat whole note is illustrated, respectively. The band of a sharp or a flat note will be colored in a binary color set combination including a first 204 and second 206 color. The first color is the color of the named whole tone. The second color is the color of the next higher whole tone if the note is a sharp or the next lower whole tone, if the note is a flat in the colors prescribed by the master matrices of Tables A and B, below. In one embodiment, the first color 204 will appear on the lower half of the note if the note is a sharp and the second color 206 will be the color of the next highest whole tone. If the note is a flat, the first color 214 will appear on an upper portion of the note and the second color 210 will appear on a lower portion thereof according to the master color matrices of Tables A and B, below. Other embodiments can have the named whole tone be the lower color, regardless of whether the note is a sharp or a flat. This applies to all notes of the color notation system of the invention. Referring specifically to FIG. 3, a diagonal line 208 separates the first and second colors, 204 and 206. The diagonal line 208 is positively sloped from left to right for sharps. Referring now to FIG. 4, the diagonal line 212 is negatively sloped from left to right for flats. Referring now to FIG. 6, a representative example of the sharp whole notes of the colored musical notation system is illustrated. Referring now to FIG. 7, a representative example of the flat whole notes of the colored musical notation system, according to the present invention, is illustrated. It should be readily apparent to a person of ordinary skill, that although a sharp note has a corresponding flat note of the same tone, they will occupy different positions on a standard five line music staff 214 and 216.

Figure 8:
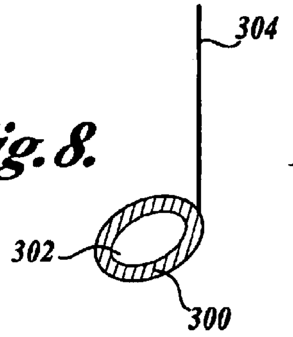
FIG. 8 is a schematic illustration of a half note according to the present invention.
Figure 9:
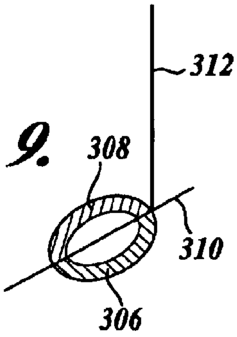
FIG. 9 is a schematic illustration of a sharp half note according to the present invention.
Figure 10:
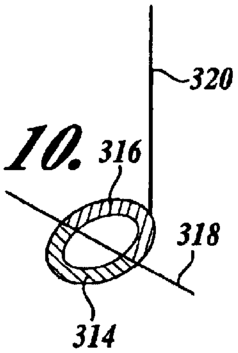
FIG. 10 is a schematic illustration of a flat half note according to the present invention.
Figure 11:
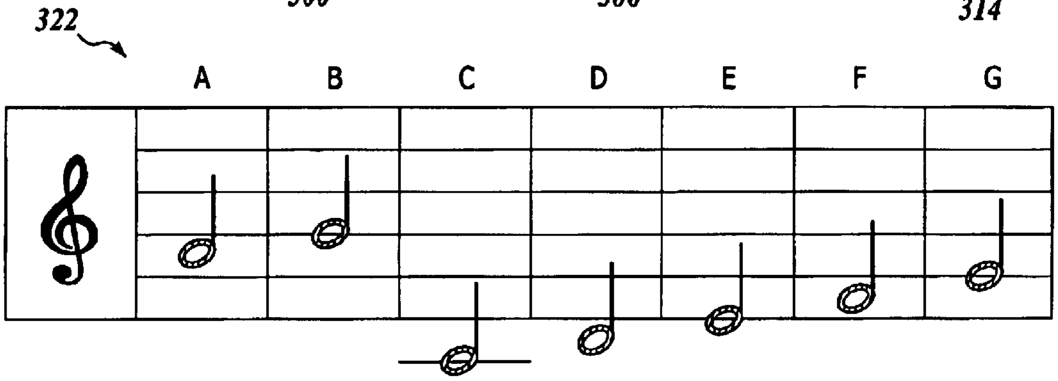
FIG. 11 is a schematic illustration of the half notes for the color music notation system according to the present invention.
Figure 12:
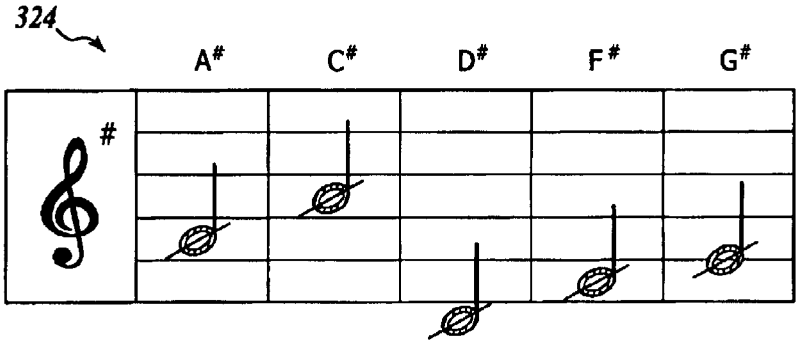
FIG. 12 is a schematic illustration of the sharp half notes for the color music notation system according to the present invention.
Figure 13:
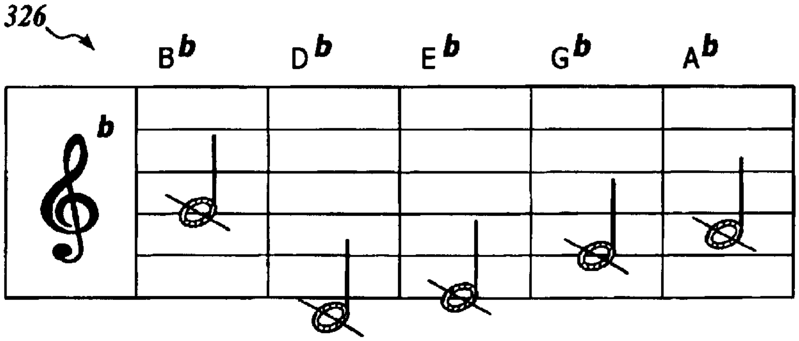
FIG. 13 is a schematic illustration of the flat half notes for the color music notation system according to the present invention.

Referring now to FIGS. 8–13, the half notes of a colored musical notation system, according to the present invention, are illustrated. Referring specifically to FIG. 8, a half note according to the present invention, is illustrated. The half note includes a colored oval band 300, ringed by a border, and a hollow center 304, ringed by a border, and a staff 304. It should be readily apparent that when referring to the pattern of a note, "staff" is the line vertical on the note, while staff, when referring to sheet music or scores are the combination of horizontal lines, on which notes are printed, and also includes the "Grand staff." The colored band of the oval is colored according to the master color matrices in Tables A and B below. Referring now to FIG. 9, a sharp half note according to the present invention, is illustrated. Both sharp and flat half notes of the invention include a colored oval, ringed by a border, and a hollow center ringed by a border, and a staff. Sharp half notes and flat half notes of the invention also include a diagonal line 310 and 318. The diagonal line 310 and 318 has a positive slope from left to right if the half note is a sharp, or a negatively sloped line if the half note is a flat, as shown in FIGS. 9 and 10 respectively. The colored portions of sharp or flat half notes, according to the invention, will include two colors, the color of the named half note and the color of the next higher or lower half note, respectively, for sharps and flats according to the master color matrices of Tables A and B below. The two colors are separated by the diagonal lines described above. In one embodiment, the first color 306 will appear on the lower portion of the note and the second color 308 will appear on an upper portion thereof. If the note is a flat, the first color 316 will appear on the upper portion of the note and the second color 314 will appear on a lower portion thereof. Referring now to FIG. 11, a representative example of the colored half notes on a five line staff 322 according to the invention, is illustrated. Referring to FIG. 12, a representative example of the colored sharp half notes on a five line staff 324 according to the invention, is illustrated. Referring to FIG. 13, a representative example of the flat half notes on a five line staff 326 according to the invention, is illustrated. It should be readily apparent to a person of ordinary skill that although a sharp half note has a corresponding flat half note of the same tone, both notes will occupy a different position on a standard five line music staff.

Referring to FIGS. 14–19, colored quarter notes of the colored music notation system according to the invention, are illustrated. Referring to FIG. 14, a colored quarter note is shown. The quarter note includes a colored oval 400 surrounded by a thin border, and a staff 402 projecting upwards or downwards from one end of the oval 400. The oval 400 is colored according to the master color matrices in Tables A and B below. Sharp and flat quarter notes include a first and second color. Referring to FIG. 15, the first color 404 is the same as the named whole note color, and the second color 406 is that of the next higher or lower note, respectively for a sharp or a flat according to the master color matrices in Tables A and B below. The sharp and flat quarter notes also include a line 408 and 414 traversing the oval separating the first and the second colors, as shown in FIGS. 15 and 14 respectively. Referring to FIG. 15, a sharp colored quarter note, according to the invention, is illustrated. The note includes a line 408 sloping positively from left to right separating the first 404 and the second 406 colors. Referring to FIG. 16, a flat colored quarter note, according to the invention, is illustrated. The note includes a line 416 sloping negatively from left to right, separating the first 412 and the second 414 color.

In one embodiment, for sharp notes the first color 404 will appear on a lower portion of the note and the second color 406 will appear on an upper portion thereof. If the note is a flat, the first color 414 will appear on an upper portion of the note and the second color 412 will appear on a lower portion thereof.

Referring to FIG. 17, a representative example of colored quarter notes on a five line staff 420 according to the invention, is illustrated. Referring to FIG. 18, a representative example of colored sharp quarter notes on a five line staff 422 according to the invention, is illustrated. Referring to FIG. 19, a representative example of colored flat quarter notes on a five line staff 420 according to the invention, is illustrated. It should be readily apparent to a person of ordinary skill that although a sharp quarter note has a corresponding flat quarter note of the same tone both notes will occupy a different position on a standard five line music staff 422 and 424.

Optionally, the method and system of musical notation illustrated by FIGS. 2–19 can be used to eliminate the standard designation for sharps and flats, such as key signatures and accidentals, from a musical score. These notations are most often used to instruct a musician to play a score in a specific musical key. By using the master color matrix and the musical notation method of the present invention, these modifiers can be eliminated since the colors and patterns of the notes designate which are sharps and flats. This renders standard sharp and flat signs in the key signature, or before each note, redundant.

Colorized Musical Instruments

Figure 20:
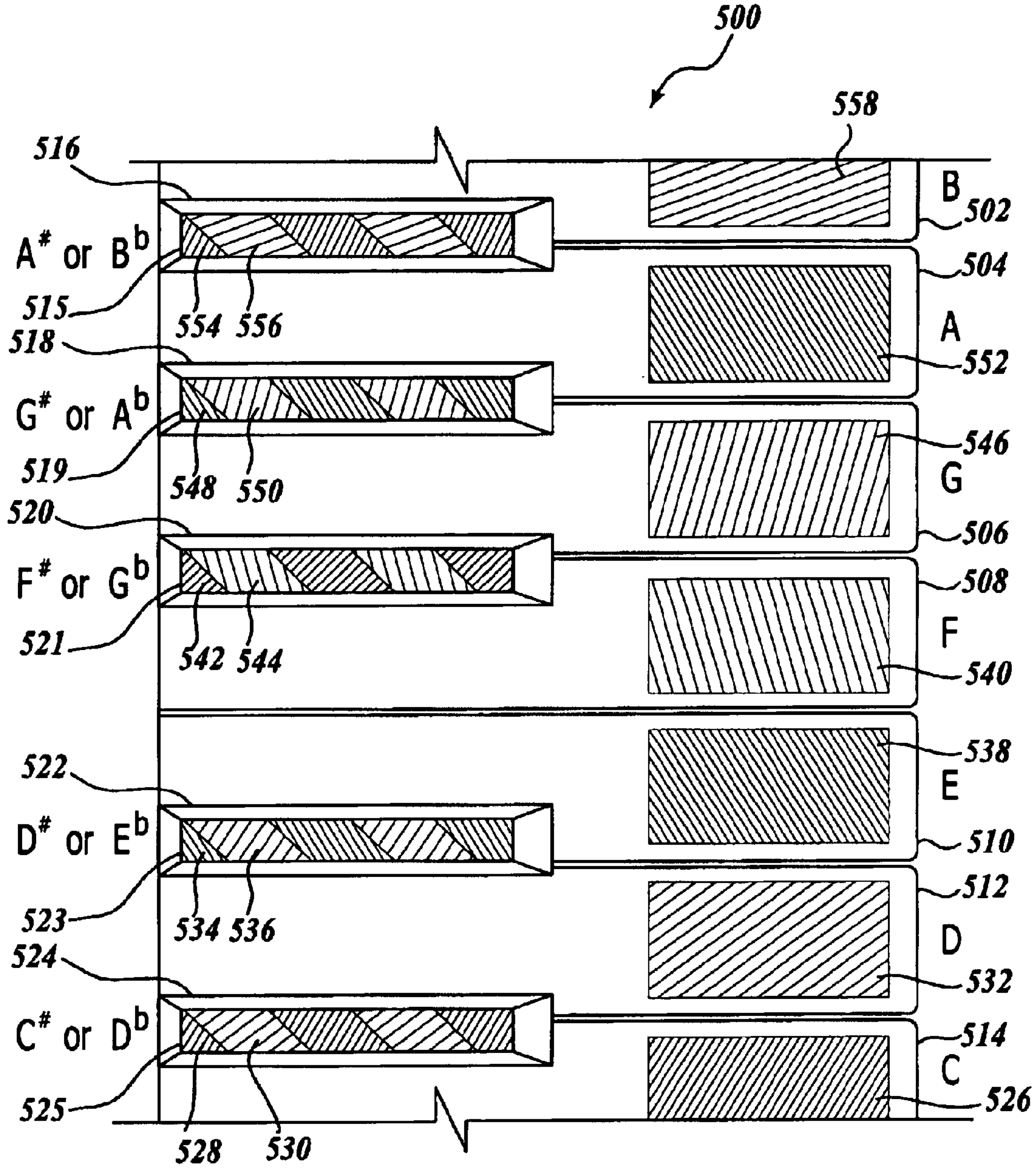
FIG. 20 is a schematic illustration of a keyboard portion of a musical instrument according to the present invention.

Referring now to FIG. 20, a first embodiment of a colored keyboard, according to the invention, is illustrated. The present invention is intended to carry the colors used in the colored musical notation system through keys on a musical instrument. For keyboard instruments, the color musical notation system is reflected in colored patterns and shapes used on the keys, provided by the musical instrument manufacturer, or in overlays that lay atop the musical instrument keys, or by other methods of display, such as light projection.

FIG. 20 represents a portion of a keyboard 500, including seven keys indicated by reference numerals 502, 504, 506, 508, 510, 512, and 514 for the seven whole tones, A, B, C, D, E, F, and G, respectively, and five keys indicated by reference numerals 516, 518, 520, 522, and 524 for the five half tones, (A# or B♭), (C# or D♭), (D# or E♭), (F# or G♭), and (G# or A♭), respectively. Reference numeral 514 represents the keyboard key for the tone "C." Key 514 for "C" includes a colored portion 526, colored according to Tables A or B below. Reference numeral 524 represents the keyboard key for C# or D♭. As shown in FIG. 20, all the standard black keys are half tones and colored in alternating colors of the two adjacent whole tones. Thus, for example, the key 524 includes a colored portion 525 having alternating regions

528 and 530 of the colors used for the tones "C" and "D." Reference numeral 512 represents the keyboard key for "D." The key 512 includes a colored portion 532. Reference numeral 522 is the keyboard key for D# or E♭. The key 522 includes a colored portion 523 having alternating regions 534 and 536 of colors according to Tables A and B, below, corresponding to the tone "D" and the tone "E." Reference numeral 510 is the keyboard key for the tone "E." The key 510 includes a colored portion 538, colored according to Tables A or B, below, corresponding to the tone "E." Reference numeral 508 is the keyboard key for the tone "F." The key 508 includes a colored portion 540 colored according to the Tables A or B, below. Reference numeral 520 is the keyboard key for the tone F# or G♭. The key 520 includes a colored portion 521 with alternating colors 542 and 544 selected from Tables A or B, below, corresponding to the tones "F" and "G." Reference 506 is the keyboard key for "G." The key 506 includes a colored portion 546 selected from the Tables A or B, below. Reference numeral 518 is the keyboard key for G# or A♭. The key 518 includes a colored portion 519. The colored portion 519 includes alternating regions 548 and 550 of colors selected from the Tables A or B, below, corresponding to the tones "G" and "A." Reference numeral 504 is the keyboard key for the tone "A." The key 504 includes a colored portion 552 selected from the Tables A or B below corresponding to the tone "A." Reference numeral 516 is the keyboard key for A# or B♭. The key 516 includes a colored portion 515, having alternating regions 554 and 556 of colors selected from the Tables A or B, below, corresponding to the colors for the tones "A" and "B." Reference numeral 502 is the keyboard key for the tone "B." The key 502 includes a colored portion 558 selected according to the Tables A or B corresponding to the tone "B."

While only a portion of the keyboard of a musical instrument has been shown, it should be readily apparent that a keyboard instrument also includes a cabinet, wires to produce sounds corresponding to the tones and a plurality of other controls in the form of foot pedals and the like. It should also be apparent that the shapes of colored portions may be rectangular, or circular, or oval, or any shape suitable to fit within the confines of the key top surface, including having any borders, such as in the color back or white colors of the keys.

Figure 21:
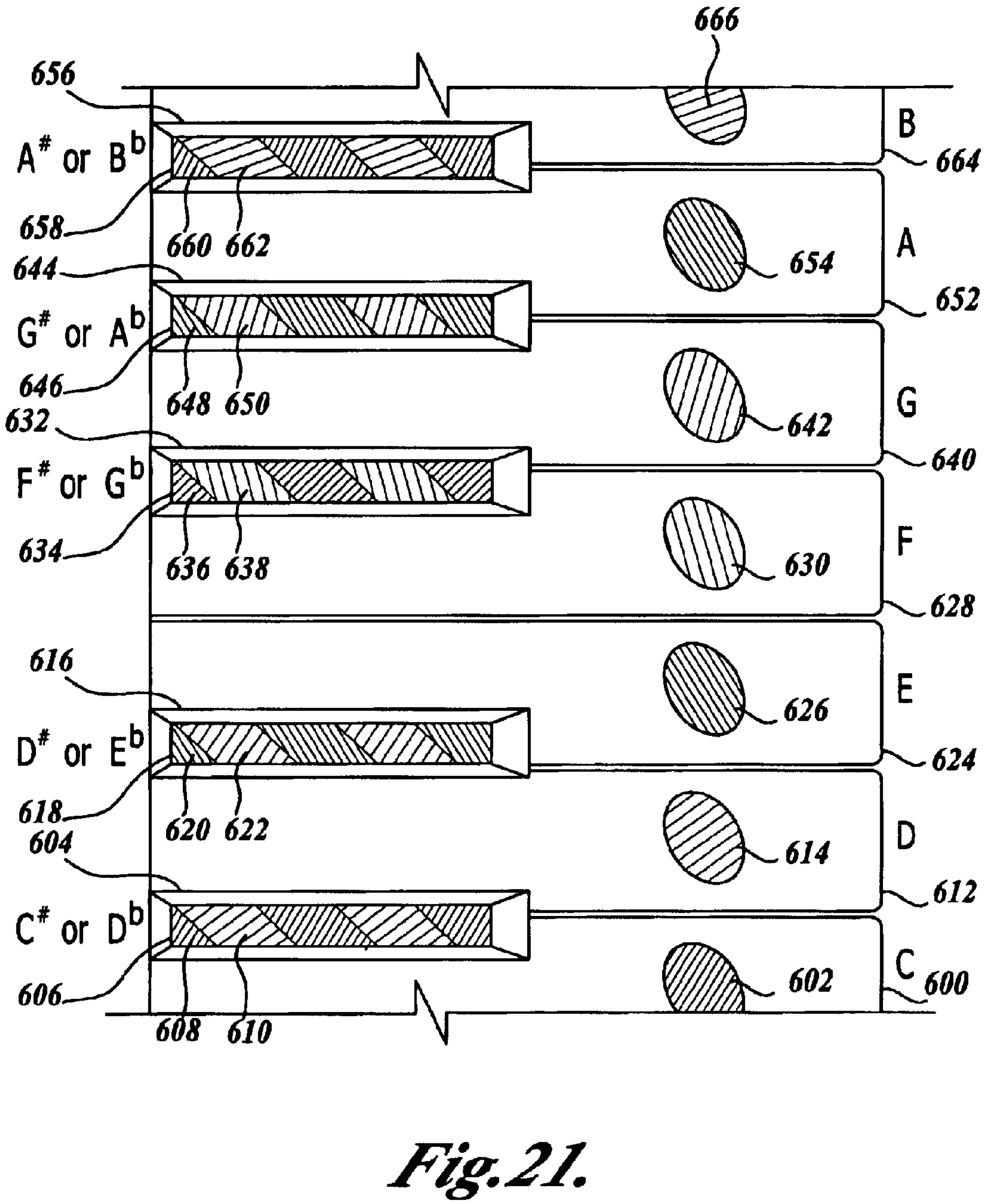
FIG. 21 is a schematic illustration of a second embodiment of a keyboard portion of a musical instrument according to the present invention.

Referring now to FIG. 21, a second embodiment of a musical instrument keyboard, having keys for the twelve tones of an octave, according to the present invention is illustrated. Reference numeral 600 is the keyboard key for the tone "C." The key 600 includes a colored portion 602, colored according to the Tables A or B, corresponding to the tone "C." Reference numeral 604 is the keyboard key for the tone C# or D♭. The key 604 includes a colored portion 606, having alternating regions 608 and 610 of color selected from the Tables A or B, below, corresponding to the tones "C" and "D." Reference numeral 612 is the keyboard key for the tone "D." The key 612 includes a colored portion 614 selected from the Tables A or B, below, corresponding to the tone "D." Reference numeral 616 is the keyboard key for the tone D# or E♭. The key 616 includes a colored portion 618, having alternating regions 620 and 622 of color selected according to the Tables A or B, below, corresponding to the tones "D" and "E." Reference numeral 624 is the keyboard key for the tone "E." The key 624 includes a colored portion 626, selected according to Tables A or B, below, corresponding to the tone "E." Reference numeral 628 is the keyboard key for the tone "F." The key 628 includes a colored portion 630 selected according to the Tables A or B, below, corresponding to the tone "F." Reference numeral 632 is the keyboard key for the tone F# or G♭. The key 632 includes a colored portion 634, having alternating regions 636 and 638 of color selected according to the Tables A or B below, corresponding to the tones "F" and "G." Reference numeral 640 is the keyboard key for the tone "G." The key 640 includes a colored portion 642, selected from the Tables A or B below, corresponding to the tone "G." Reference numeral 644 is the keyboard key for the tone G# or A♭. The key 644 includes a colored portion 646, having alternating regions 648 and 650 of color, selected from the Tables A or B below, corresponding to the tones "G" and "A." Reference numeral 652 is the keyboard key for the note "A." The key 652 includes a colored portion 654 selected according to the Tables A or B below, corresponding to the tone "A." Reference numeral 656 is the keyboard key for the tone A# or B♭. The key 656 includes a colored region 658, having alternating regions 660 and 662 of color, selected from the Tables A or B below, corresponding to the tone "A" and "B." Reference numeral 664 is the keyboard key for the tone "B." The key 664 includes a colored portion 666, selected from the Tables A or B below, corresponding to the tone B.

The present invention includes using musical instruments with keys colored according to the master color matrices of Tables A and B so that they directly correlate with the notes of colored musical scores produced according to the present invention, thus, creating a musical system. Preferably, musical instruments can be produced with keys already colored according to the master color matrices shown in Tables A and B. However, the present invention also includes methods and apparatus for retrofitting existing musical instruments so that their keys can directly correlate with both the colors of the master color matrices shown in Tables A and B and the colored musical scores produced according to the present invention.

As mentioned previously, the method of transferring the colors onto the musical keys of the musical instrument may include one or more separate embodiments.

Figure 22:
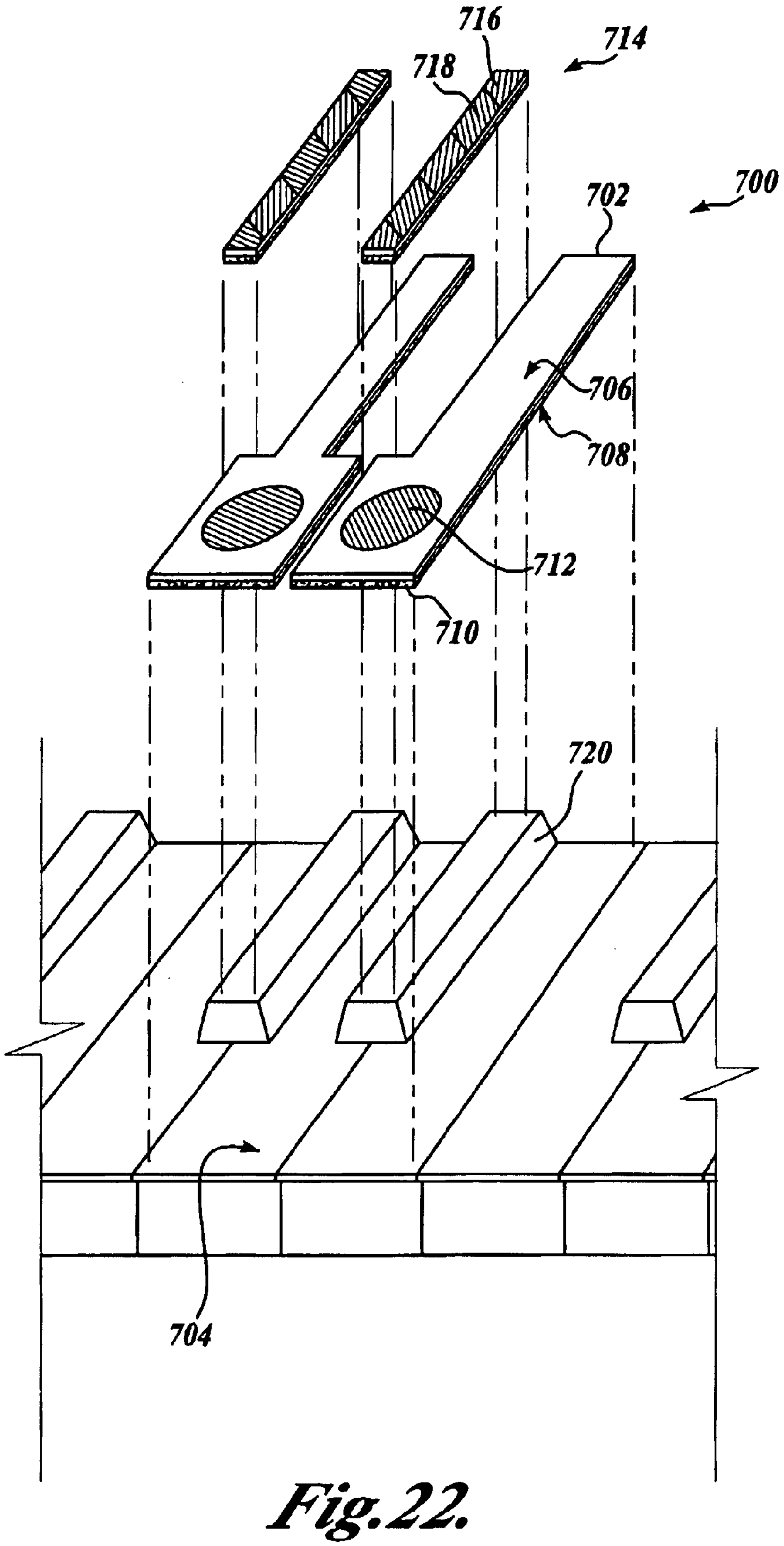
FIG. 22 is a schematic illustration of color keyboard overlays according to the present invention.
Figure 26:
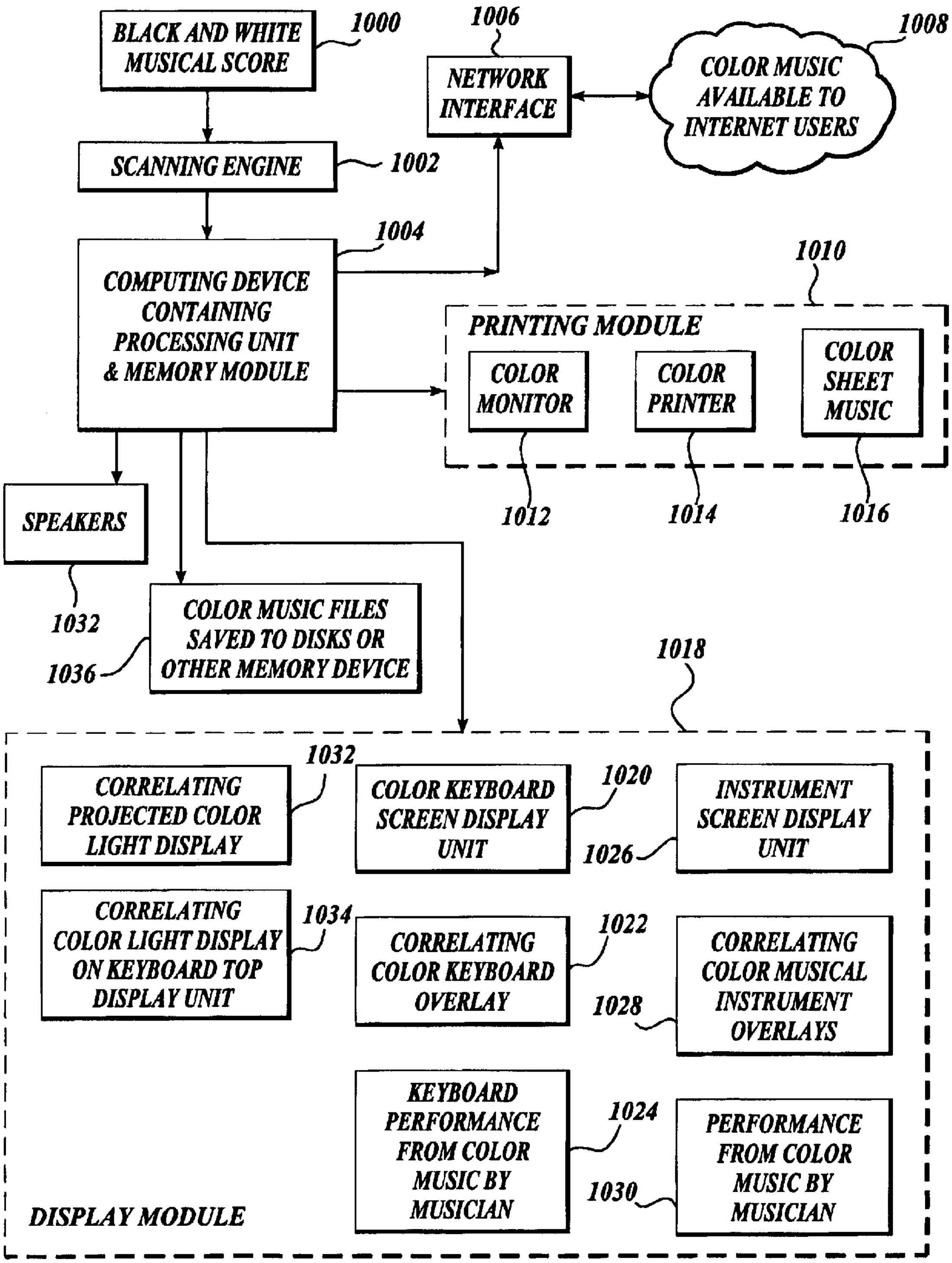
FIG. 26 is a schematic illustration of the system and methods for colorizing black and white musical scores into colorized musical scores according to the present invention.

A first embodiment of transferring color to musical instrument keys is described in FIG. 26, 1022 and further illustrated in FIG. 22. FIG. 22 shows thin plastic keyboard overlays 700, having colored portions which will be colored to correspond to the key to which it is to be applied. Overlay 702 is an overlay device for applying directly on a top surface of the key 704. The overlay 702 includes a first side 706 and a back side 708. The back side is provided with an applicator 710. In one embodiment, the applicator is an adhesive, while in a second embodiment, the applicator uses static electricity. The applicator 710 bonds to the upper surface of a key 704. The overlay further includes an area 712, wherein the color 712 matches the color defined by the tone produced by the key 704, according to Tables A or B. In addition to using the colors described in Tables A or B, below, the overlay can include distinguishing features to further set each key apart from one another. For example, overlays can come in many shapes and sizes, such as rectangles, squares, circles or like shapes. The overlays 714 for half tone keys 720, according to the present invention, will have alternating regions 716 and 718 in the colors of the named tone and the color of the next higher or lower tone, respectively, for sharp and flat keys of the musical instrument. The overlays may have sections of clear, transparent or translucent sheet material, such as plastic, that will allow the natural color of the musical instrument keys to show through the overlays. Thus, for a keyboard having white and black musical keys, white and black colors of the underlying musical key will show through as, for example, white or black borders, or as black or white ends. Alternatively, overlays may be opaque.

In still other embodiments, a single overlay may lie atop the whole tone (white) keys, and a second overlay will lie atop the half tone (black) keys.

The thin plastic overlays can be made by several methods. One method is to partially cut each strip using the "kiss-cutting" process into the 52 individual colored overlays for the white keys and 36 individual colored overlays for the black keys. The back of each strip is covered with a non-damaging soluble adhesive, which is covered with a paper backing. The colors and patterns are applied by placing one end of the strip over the top or bottom key of the piano and then progressively removing the adhesive backing while applying each overlay to the corresponding key. Each individual colored key overlay will then be correctly positioned on the keyboard such that the keys are marked to correspond to the colors prescribed by the master color matrix according to Tables A and B, below, and as used in the colored musical scores produced according to the present invention. Alternatively, 88 individual key overlays can be used individually when applied to each key to achieve a same correlation with the master color matrix and the colored musical scores produced according to the present invention. An alternative, and preferable, method to using adhesive to apply the plastic overlays to the keys is to produce the overlays on electrostatically treated film which can then be attached to the keys with static pressure, and easily removed without damaging the keyboard.

Another embodiment for correlating the colors and patterns of the master color matrix and the colored musical scores produced by the methods according to the present invention to the keyboard of a standard keyboard musical instrument is to use a strip of paper or plastic the length of a keyboard that can be placed on a shelf behind a standard 88 keyed instrument, such as a piano. As graphically illustrated by FIG. 23, a student keyboard guide 808 can be printed with the shapes of each key and colored according to the master color matrices of Tables A and B, as shown by FIGS. 20 and 21, to correlate with the colored musical scores produced according to the present invention.

In addition to retrofitting keyboard instruments so that their keys directly correlate with the colors of the master color matrices of Tables A and B, and the colored musical scores produced according to the present invention, thereby creating a musical system, the present invention also can be applied by slight modification to specialized overlays to similarly retrofit the keys of all other musical instruments as shown in FIG. 16, 1028. Stringed instruments such as guitars, violins, and cellos may be retrofitted by placing color and pattern indicators on the shafts underneath the strings. Wind instruments such as saxophones, flutes, and clarinets may be retrofitted by placing color and pattern indicators around the apertures. Because the shapes of wind instruments vary greatly, the preferred overlays for these instruments will be electrostatically treated thin plastic overlays.

TABLE A

| FIRST EMBODIMENT OF COLORS FOR MUSIC NOTATION, MUSICAL INSTRUMENTS, OVERLAYS, AND LIGHT DISPLAYS<br>Whole, quarter and half notes in musical scores, the keys of musical instruments, student guides, and light displays are colored by selecting one PANTONE ® number for the whole and half tones A, (A# or B♭) B, C, (C# or D♭), D, (D# or E♭), E, F (F# or G♭), G (G# or A♭) from its corresponding group below. PANTONE ® color codes are recognized for the accurate communication of color in many areas. PANTONE ® products are available from Pantone, Inc. of Carlstadt, NJ 07072. |
|---|
| C |
| 165 C, U, 2X |
| 185 C, U, 2X |
| 178 C, U, 179 C, U, 180 C, U, 181 C, U |
| 1785 C, U, 1788 C, U, 1795 C, U, 1805 C, U, 1815 C, U |
| 1787 C, U |
| 1788 C, U, 2X |
| 1797 C, U, 1807 C, U, 1817 C, U |
| 185 C, U, 186 C, U, 187 C, U, 188 C, U |
| 192 C, U, 193 C, U, 194 C, U, 195 C, U |
| 1925 C, U, 1935 C, U, 1945 C, U, 1955 C, U |
| 198 C, U, 199 C, U, 200 C, U, 201 C, U, 202 C, U |
| 206 C, U, 207 C, U, 208 C, U, 209 C, U |
| 213 C, U, 214 C, U, 215 C, U, 216 C, U |
| 239 C, U, 2X |
| 291 C, U, 220 C, U, 221 C, U |
| 225 C, U, 226 C, U, 227 C, U, 228 C, U |
| 233 C, U, 234 C, U, 235 C, U |
| 239 C, U, 240 C, U, 241 C, U |
| 2395 C, U, 2405 C, U, 2415 C, U |
| 246 C, U, 247 C, U, 248 C, U |
| 484 C, U |
| 485 C, U |
| 485 C, U, 2X |
| 491 C, U, 492 C, U |
| 505 C, U, 506 C, U |
| 512 C, U, 513 C, U |
| 675 C, U, 676 C, U |
| 681 C, U, 682 C, U, 683 C, U |
| 700 C, U, 701 C, U, 702 C, U, 703 C, U, 704 C, U |
| 709 C, U, 710 C, U, 711 C, U |
| 805 C, U, 2X |
| 811 C |
| 811 C, U, 2X |
| Hexachrome Magenta C, U |
| Process Magenta C, U |
| Red 032 C, U |
| Rhodamine Red C, U |
| Rhodamine Red C, U, 2X |
| Rubine Red C, U |
| Rubine Red C, U, 2X |
| Warm Red C, U |
| C# or Db |
| (combination of the following two Sets A and B) |
| Set A |
| 165 C, U, 2X |
| 185 C, U, 2X |
| 178 C, U, 179 C, U, 180 C, U, 181 C, U |
| 1785 C, U, 1788 C, U, 1795 C, U, 1805 C, U, 1815 C, U |
| 1787 C, U |
| 1788 C, U, 2X |
| 1797 C, U, 1807 C, U, 1817 C, U |
| 185 C, U, 186 C, U, 187 C, U, 188 C, U |
| 192 C, U, 193 C, U, 194 C, U, 195 C, U |
| 1925 C, U, 1935 C, U, 1945 C, U, 1955 C, U |
| 198 C, U, 199 C, U, 200 C, U, 201 C, U, 202 C, U |
| 206 C, U, 207 C, U, 208 C, U, 209 C, U |
| 213 C, U, 214 C, U, 215 C, U, 216 C, U |
| 239 C, 2X |
| 291 C, U, 220 C, U, 221 C, U |

TABLE A-continued

| FIRST EMBODIMENT OF COLORS FOR MUSIC NOTATION, MUSICAL INSTRUMENTS, OVERLAYS, AND LIGHT DISPLAYS Whole, quarter and half notes in musical scores, the keys of musical instruments, student guides, and light displays are colored by selecting one PANTONE ® number for the whole and half tones A, (A# or B♭) B, C, (C# or D♭), D, (D# or E♭), E, F (F# or G♭), G (G# or A♭) from its corresponding group below. PANTONE ® color codes are recognized for the accurate communication of color in many areas. PANTONE ® products are available from Pantone, Inc. of Carlstadt, NJ 07072. |
|---|
| 225 C, U, 226 C, U, 227 C, U, 228 C, U |
| 233 C, U, 234 C, U, 235 C, U |
| 239 C, U, 240 C, U, 241 C, U |
| 2395 C, U, 2405 C, U, 2415 C, U |
| 246 C, U, 247 C, U, 248 C, U |
| 484 C, U |
| 485 C, U |
| 485 C, U 2X |
| 491 C, U, 492 C, U |
| 505 C, U, 506 C, U |
| 512 C, U, 513 C, U |
| 675 C, U, 676 C, U |
| 681 C, U, 682 C, U, 683 C, U |
| 700 C, U, 701 C, U, 702 C, U, 703 C, U, 704 C, U |
| 709 C, U, 710 C, U, 711 C, U |
| 805 C, U, 2X |
| 811 C |
| 811 C, U, 2X |
| Hexachrome Magenta C, U |
| Process Magenta C, U |
| Red 032 C, U |
| Rhodamine Red C, U |
| Rhodamine Red C, U, 2X |
| Rubine Red C, U |
| Rubine Red C, U, 2X |
| Warm Red C, U |
| Set B |
| 116 C, U, 2X |
| 123 C, U, 124 C, U, 125 C, U |
| 1215 C, U, 1225 C, U, 1235 C, U, 1245 C, U |
| 129 C, U, 130 C, U, 131 C, U |
| 130 C, U, 2X |
| 134 C, U, 135 C, U, 136 C, U, 137 C, U, 138 C, U, 139 C, U |
| 1345 C, U, 1355 C, U, 1365 C, U, 1375 C, U, 1385 C, U, 1395 C, U |
| 141 C, U, 142 C, U, 143 C, U, 144 C, U, 145 C, U, 146 C, U |
| 148 C, U, 149 C, U, 150 C, U, 151 C, U, 152 C, U, 153 C, U, 154 C, U |
| 1485 C, U, 1495 C, U, 1505 C, U |
| 1525 C, U, 1535 C, U |
| 156 C, U, 157 C, U, 158 C, U, 159 C, U, 160 C, U |
| 1555 C, U, 1565 C, U, 1575 C, U, 1585 C, U, 1595 C, U, 1605 C, U |
| 162 C, U, 163 C, U, 164 C, U, 165 C, U, 166 C, U, 167 C, U |
| 165 C, U, 2X |
| 1625 C, U, 1635 C, U, 1645 C, U, 1655 C, U, 1665 C, U, 1675 C, U |
| 169 C, U, 170 C, U, 171 C, U, 172 C, U, 173 C, U, 174 C, U |
| 470 C, U, 471 C, U, 472 C, U, 473 C, U, 474 C, U |
| 471 C, U 2X |
| 712 C, U, 713 C, U, 714 C, U, 715 C, U, 716 C, U, 717 C, U, 718 C, U |
| 719 C, U, 720 C, U, 721 C, U, 722 C, U, 723 C, U, 724 C, U, 725 C, U |
| 804 C, U |
| 804 C, U, 2X |
| 805 C, U |
| 805 C, U, 2X |
| 810 C, U, 811 C, U |
| 810 C, U, 2X |
| 811 C, U 2X |
| Hexachrome Orange C, U |
| Orange 021 C, U |
| Warm Red C, U |
| D |
| 116 C, U, 2X |
| 123 C, U, 124 C, U, 125 C, U |

TABLE A-continued

| FIRST EMBODIMENT OF COLORS FOR MUSIC NOTATION, MUSICAL INSTRUMENTS, OVERLAYS, AND LIGHT DISPLAYS Whole, quarter and half notes in musical scores, the keys of musical instruments, student guides, and light displays are colored by selecting one PANTONE ® number for the whole and half tones A, (A# or B♭) B, C, (C# or D♭), D, (D# or E♭), E, F (F# or G♭), G (G# or A♭) from its corresponding group below. PANTONE ® color codes are recognized for the accurate communication of color in many areas. PANTONE ® products are available from Pantone, Inc. of Carlstadt, NJ 07072. |
|---|
| 1215 C, U, 1225 C, U, 1235 C, U, 1245 C, U |
| 129 C, U, 130 C, U, 131 C, U |
| 130 C, U 2X |
| 134 C, U, 135 C, U, 136 C, U, 137 C, U, 138 C, U, 139 C, U |
| 1345 C, U, 1355 C, U, 1365 C, U, 1375 C, U, 1385 C, U, 1395 C, U |
| 141 C, U, 142 C, U, 143 C, U, 144 C, U, 145 C, U, 146 C, U |
| 148 C, U, 149 C, U, 150 C, U, 151 C, U, 152 C, U, 153 C, U, 154 C, U |
| 1485 C, U, 1495 C, U, 1505 C, U |
| 1525 C, U, 1535 C, U |
| 156 C, U, 157 C, U, 158 C, U, 159 C, U, 160 C, U |
| 1555 C, U, 1565 C, U, 1575 C, U, 1585 C, U, 1595 C, U, 1605 C, U |
| 162 C, U, 163 C, U, 164 C, U, 165 C, U, 166 C, U, 167 C, U |
| 165 C, U, 2X |
| 1625 C, U, 1635 C, U, 1645 C, U, 1655 C, U, 1665 C, U, 1675 C, U |
| 169 C, U, 170 C, U, 171 C, U, 172 C, U, 173 C, U, 174 C, U |
| 470 C, U, 471 C, U, 472 C, U, 473 C, U, 474 C, U |
| 471 C, U, 2X |
| 712 C, U, 713 C, U, 714 C, U, 715 C, U, 716 C, U, 717 C, U, 718 C, U |
| 719 C, U, 720 C, U, 721 C, U, 722 C, U, 723 C, U, 724 C, U, 725 C, U |
| 804 C, U |
| 804 C, U, 2X |
| 805 C, U |
| 805 C, U, 2X |
| 810 C, U, 811 C, U |
| 810 C, U, 2X |
| 811 C, U, 2X |
| Hexachrome Orange C, U |
| Orange 021 C, U |
| Warm Red C, U |
| D# or Eb |
| (combination of the following two Sets A and B) |
| Set A |
| 116 C, U, 2X |
| 123 C, U, 124 C, U, 125 C, U |
| 1215 C, U, 1225 C, U, 1235 C, U, 1245 C, U |
| 129 C, U, 130 C, U, 131 C, U |
| 130 C, U, 2X |
| 134 C, U, 135 C, U, 136 C, U, 137 C, U, 138 C, U, 139 C, U |
| 1345 C, U, 1355 C, U, 1365 C, U, 1375 C, U, 1385 C, U, 1395 C, U |
| 141 C, U, 142 C, U, 143 C, U, 144 C, U, 145 C, U, 146 C, U |
| 148 C, U, 149 C, U, 150 C, U, 151 C, U, 152 C, U, 153 C, U, 154 C, U |
| 1485 C, U, 1495 C, U, 1505 C, U |
| 1525 C, U, 1535 C, U |
| 156 C, U, 157 C, U, 158 C, U, 159 C, U, 160 C, U |
| 1555 C, U, 1565 C, U, 1575 C, U, 1585 C, U, 1595 C, U, 1605 C, U |
| 162 C, U, 163 C, U, 164 C, U, 165 C, U, 166 C, U, 167 C, U |
| 165 C, U, 2X |
| 1625 C, U, 1635 C, U, 1645 C, U, 1655 C, U, 1665 C, U, 1675 C, U |
| 169 C, U, 170 C, U, 171 C, U, 172 C, U, 173 C, U, 174 C, U |
| 470 C, U, 471 C, U, 472 C, U, 473 C, U, 474 C, U |
| 471 C, U, 2X |
| 712 C, U, 713 C, U, 714 C, U, 715 C, U, 716 C, U, 717 C, U, 718 C, U |
| 719 C, U, 720 C, U, 721 C, U, 722 C, U, 723 C, U, 724 C, U, 725 C, U |
| 804 C, U |
| 804 C, U, 2X |
| 805 C, U |
| 805 C, U, 2X |
| 810 C, U, 811 C, U |
| 810 C, U, 2X |
| 811 C, U, 2X |
| Hexachrome Orange C, U |

TABLE A-continued

| FIRST EMBODIMENT OF COLORS FOR MUSIC NOTATION, MUSICAL INSTRUMENTS, OVERLAYS, AND LIGHT DISPLAYS Whole, quarter and half notes in musical scores, the keys of musical instruments, student guides, and light displays are colored by selecting one PANTONE ® number for the whole and half tones A, (A# or B♭) B, C, (C# or D♭), D, (D# or E♭), E, F (F# or G♭), G (G# or A♭) from its corresponding group below. PANTONE ® color codes are recognized for the accurate communication of color in many areas. PANTONE ® products are available from Pantone, Inc. of Carlstadt, NJ 07072. |
|---|
| Orange 021 C, U |
| Warm Red C, U |
| Set B |
| 100 C, U, 101 C, U, 102 C, U, 103 C, U, 104 C, U |
| 106 C, U, 107 C, U, 108 C, U, 109 C, U, 110 C, U, 111 C, U |
| 113 C, U, 114 C, U, 115 C, U, 116 C, U, 117 C, U, 118 C, U |
| 120 C, U, 121 C, U, 122 C, U, 123 C, U, 124 C, U, 125 C, U |
| 1025 C, U, 1215 C, U, 1225 C, U, 1235 C, U, 1245 C, U |
| 127 C, U, 128 C, U, 129 C, U, 130 C, U, 131 C, U, 132 C, U |
| 134 C, U, 135 C, U |
| 1345 C, U, 1355 C, U |
| 141 C, U, 142 C, U, 143 C, U |
| 379 C, U, 380 C, U |
| 386 C, U, 387 C, U, 388 C, U, 389 C, U |
| 393 C, U, 394 C, U, 395 C, U, 396 C, U, 397 C, U, 398 C, U, 399 C, U |
| 3935 C, U, 3945 C, U, 3955 C, U, 3965 C, U, 3975 C, U, 3985 C, U |
| 456 C, U, 457 C, U, 458 C, U, 459 C, U, 460 C, U, 461 C, U |
| 584 C, U, 585 C, U, 586 C, U, 587 C, U |
| 600 C, U, 601 C, U, 602 C, U, 603 C, U, 604 C, U, 605 C, U, 606 C, U |
| 607 C, U, 608 C, U, 609 C, U, 610 C, U, 611 C, U, 612 C, U, 613 C, U |
| 614 C, U, 615 C, U, 616 C, U, 617 C, U, 618 C, U, 619 C, U |
| 803 C, U |
| 803 C, U, 2X |
| 809 C, U, 2X |
| 809 C, U |
| Hexachrome Yellow C, U |
| Process Yellow C, U |
| Yellow C, U, 2X |
| Yellow C, U |
| Yellow 012 C, U |
| E |
| 100 C, U, 101 C, U, 102 C, U, 103 C, U, 104 C, U |
| 106 C, U, 107 C, U, 108 C, U, 109 C, U, 110 C, U, 111 C, U |
| 113 C, U, 114 C, U, 115 C, U, 116 C, U, 117 C, U, 118 C, U |
| 120 C, U, 121 C, U, 122 C, U, 123 C, U, 124 C, U, 125 C, U |
| 1025 C, U, 1215 C, U, 1225 C, U, 1235 C, U, 1245 C, U |
| 127 C, U, 128 C, U, 129 C, U, 130 C, U, 131 C, U, 132 C, U |
| 134 C, U, 135 C, U |
| 1345 C, U, 1355 C, U |
| 141 C, U, 142 C, U, 143 C, U |
| 379 C, U, 380 C, U |
| 386 C, U, 387 C, U, 388 C, U, 389 C, U |
| 393 C, U, 394 C, U, 395 C, U, 396 C, U, 397 C, U, 398 C, U, 399 C, U |
| 3935 C, U, 3945 C, U, 3955 C, U, 3965 C, U, 3975 C, U, 3985 C, U |
| 456 C, U, 457 C, U, 458 C, U, 459 C, U, 460 C, U, 461 C, U |
| 584 C, U, 585 C, U, 586 C, U, 587 C, U |
| 600 C, U, 601 C, U, 602 C, U, 603 C, U, 604 C, U, 605 C, U, 606 C, U |
| 607 C, U, 608 C, U, 609 C, U, 610 C, U, 611 C, U, 612 C, U, 613 C, U |
| 614 C, U, 615 C, U, 616 C, U, 617 C, U, 618 C, U, 619 C, U |
| 803 C, U |
| 803 C, U, 2X |
| 809 C, U, 2X |
| 809 C, U |
| Hexachrome Yellow C, U |
| Process Yellow C, U |
| Yellow C, U, 2X |
| Yellow C, U |
| Yellow 012 C, U |

TABLE A-continued

| FIRST EMBODIMENT OF COLORS FOR MUSIC NOTATION, MUSICAL INSTRUMENTS, OVERLAYS, AND LIGHT DISPLAYS Whole, quarter and half notes in musical scores, the keys of musical instruments, student guides, and light displays are colored by selecting one PANTONE ® number for the whole and half tones A, (A# or B♭) B, C, (C# or D♭), D, (D# or E♭), E, F (F# or G♭), G (G# or A♭) from its corresponding group below. PANTONE ® color codes are recognized for the accurate communication of color in many areas. PANTONE ® products are available from Pantone, Inc. of Carlstadt, NJ 07072. |
|---|
| F |
| 103 C, U, 104 C, U, 105 C, U |
| 110 C, U, 111 C, U, 112 C, U |
| 117 C, U, 118 C, U, 119 C, U |
| 3375 C, U, 3385 C, U, 3395 C, U, 3405 C, U, 3415 C, U, 3425 C, U |
| 344 C, 345 C, U, 346 C, U, 347 C, U, 348 C, U, 349 C, U |
| 351 C, U, 352 C, U, 353 C, U, 354 C, U, 355 C, U, 356 C, U |
| 354 C, U, 2X |
| 358 C, U, 359 C, U, 360 C, U, 361 C, U, 362 C, U, 363 C, U, 364 C, U |
| 365 C, U, 366 C, U, 367 C, U, 368 C, U, 369 C, U, 370 C, U, 371 C, U |
| 368 C, U, 2X |
| 372 C, U, 373 C, U, 374 C, U, 375 C, U, 376 C, U, 377 C, U, 378 C, U |
| 375 C, U, 2X |
| 379 C, U, 380 C, U, 381 C, U, 382 C, U, 383 C, U, 384 C, U, 385 C, U |
| 382 C, U, 2X |
| 386 C, U, 387 C, U, 388 C, U, 389 C, U, 390 C, U, 391 C, U, 392 C, U |
| 393 C, U, 394 C, U, 395 C, U, 396 C, U, 397 C, U, 398 C, U, 399 C, U |
| 3935 C, U, 3945 C, U, 3955 C, U, 3965 C, U, 3975 C, U, 3985 C, U |
| 455 C, U, 456 C, U, 457 C, U, 458 C, U |
| 575 C, U, 576 C, U, 577 C, U, 578 C, U, 579 C, U, 580 C, U |
| 5757 C, U, 5767 C, U |
| 582 C, U, 583 C, U, 584 C, U, 585 C, U, 586 C, U, 587 C, U |
| 5825 C, U, 5835 C, U, 5845 C, U |
| 611 C, U, 612 C, U, 613 C, U |
| 618 C, U, 619 C, U, 620 C, U |
| 802 C, U |
| 802 C, U, 2X |
| 808 C, U |
| 808 C, U, 2X |
| 809 C |
| 809C, U2X |
| Green C, U |
| Green C, U, 2X |
| Hexachrome Green C, U |
| F# or G♭ (combination of the following two Sets A and B) |
| Set A |
| 103 C, U, 104 C, U, 105 C, U |
| 110 C, U, 111 C, U, 112 C, U |
| 117 C, U, 118 C, U, 119 C, U |
| 3375 C, U, 3385 C, U, 3395 C, U, 3405 C, U, 3415 C, U, 3425 C, U |
| 344 C, 345 C, U, 346 C, U, 347 C, U, 348 C, U, 349 C, U |
| 351 C, U, 352 C, U, 353 C, U, 354 C, U, 355 C, U, 356 C, U |
| 354 C, U, 2X |
| 358 C, U, 359 C, U, 360 C, U, 361 C, U, 362 C, U, 363 C, U, 364 C, U |
| 365 C, U, 366 C, U, 367 C, U, 368 C, U, 369 C, U, 370 C, U, 371 C, U |
| 368 C, U, 2X |
| 372 C, U, 373 C, U, 374 C, U, 375 C, U, 376 C, U, 377 C, U, 378 C, U |
| 375 C, U, 2X |
| 379 C, U, 380 C, U, 381 C, U, 382 C, U, 383 C, U, 384 C, U, 385 C, U |
| 382 C, U, 2X |
| 386 C, U, 387 C, U, 388 C, U, 389 C, U, 390 C, U, 391 C, U, 392 C, U |
| 393 C, U, 394 C, U, 395 C, U, 396 C, U, 397 C, U, 398 C, U, 399 C, U |
| 3935 C, U, 3945 C, U, 3955 C, U, 3965 C, U, 3975 C, U, 3985 C, U |
| 455 C, U, 456 C, U, 457 C, U, 458 C, U |
| 575 C, U, 576 C, U, 577 C, U, 578 C, U, 579 C, U, 580 C, U |
| 5757 C, U, 5767 C, U |
| 582 C, U, 583 C, U, 584 C, U, 585 C, U, 586 C, U, 587 C, U |
| 5825 C, U, 5835 C, U, 5845 C, U |
| 611 C, U, 612 C, U, 613 C, U |

TABLE A-continued

| FIRST EMBODIMENT OF COLORS FOR MUSIC NOTATION, MUSICAL INSTRUMENTS, OVERLAYS, AND LIGHT DISPLAYS Whole, quarter and half notes in musical scores, the keys of musical instruments, student guides, and light displays are colored by selecting one PANTONE ® number for the whole and half tones A, (A# or B♭) B, C, (C# or D♭), D, (D# or E♭), E, F (F# or G♭), G (G# or A♭) from its corresponding group below. PANTONE ® color codes are recognized for the accurate communication of color in many areas. PANTONE ® products are available from Pantone, Inc. of Carlstadt, NJ 07072. |
|---|
| 618 C, U, 619 C, U, 620 C, U |
| 802 C, U |
| 802 C, U, 2X |
| 808 C, U |
| 808 C, U, 2X |
| 809 C |
| 809 C, U, 2X |
| Green C, U |
| Green C, U, 2X |
| Hexachrome Green C, U |
| Set B |
| 2706 C, U, 2716 C, U |
| 2707 C, U, 2717 C, U, 2727 C, U |
| 2798 C, U, 2718 C, U |
| 277 C, U, 278 C, U, 279 C, U |
| 283 C, U, 284 C, U, 285 C, U |
| 290 C, U, 291, C, U, 292 C, U |
| 2905 C, U, 2915 C, U, 2925 C, U, 2935 C, U |
| 297 C, U, 298 C, U, 299 C, U, 300 C, U, 301 C, U |
| 297 C, U, 298 C, U, 299 C, U, 300 C, U |
| 2975 C, U, 2985 C, U, 2995 C, U, 3005 C, U |
| 299 C, U, 2X |
| 302 C, U, 2X |
| 312 C, U |
| 310 C, U, 311 C, U, 312 C, U, 313 C, U, 314 C, U, 315 C, U |
| 3105 C, U, 3115 C, U, 3125 C, U, 3135 C, U, 3145 C, U, 3155 C, U |
| 317 C, U, 318 C, U, 319 C, U, 320 C, U, 321 C, U, 322 C, U |
| 320 C, U, 2X |
| 324 C, U, 325 C, U, 326 C, U, 327 C, U, 328 C, U, 329 C, U |
| 304 C, U, 305 C, U, 306 C, U, 308 C, U |
| 542 C, U, 543 C, U, 544 C, U, 545 C, U |
| 549 C, U, 550 C, U, 551 C, U, 552 C, U |
| 628 C, U, 629 C, U, 630 C, U, 631 C, U, 632 C, U, 633 C, U, 634 C, U |
| 635 C, U, 636 C, U, 637 C, U, 638 C, U, 639 C, U, 640 C, U, 641 C, U |
| 642 C, U, 643 C, U, 644 C, U, 645 C, U, 646 C, U |
| 649 C, U, 650 C, U, 651 C, U, 652 C, U |
| 656 C, U, 657 C, U, 658 C, U, 659 C, U, 660 C, U, 661 C, U |
| 801 C, U |
| 801 C, U, 2X |
| Hexachrome Cyan C, U |
| Process Blue C, U |
| Process Blue C, U, 2X |
| Process Cyan C, U |
| G |
| 2706 C, U, 2716 C, U |
| 2707 C, U, 2717 C, U, 2727 C, U |
| 2798 C, U, 2718 C, U |
| 277 C, U, 278 C, U, 279 C, U |
| 283 C, U, 284 C, U, 285 C, U |
| 290 C, U, 291, C, U, 292 C, U |
| 2905 C, U, 2915 C, U, 2925 C, U, 2935 C, U |
| 297 C, U, 298 C, U, 299 C, U, 300 C, U, 301 C, U |
| 297 C, U, 298 C, U, 299 C, U, 300 C, U |
| 2975 C, U, 2985 C, U, 2995 C, U, 3005 C, U |
| 299 C, U, 2X |
| 302 C, U, 2X |
| 312 C, U |
| 310 C, U, 311 C, U, 312 C, U, 313 C, U, 314 C, U, 315 C, U |
| 3105 C, U, 3115 C, U, 3125 C, U, 3135 C, U, 3145 C, U, 3155 C, U |
| 317 C, U, 318 C, U, 319 C, U, 320 C, U, 321 C, U, 322 C, U |
| 320 C, U, 2X |

TABLE A-continued

FIRST EMBODIMENT OF COLORS FOR MUSIC NOTATION, MUSICAL INSTRUMENTS, OVERLAYS, AND LIGHT DISPLAYS Whole, quarter and half notes in musical scores, the keys of musical instruments, student guides, and light displays are colored by selecting one PANTONE ® number for the whole and half tones A, (A# or B♭) B, C, (C# or D♭), D, (D# or E♭), E, F (F# or G♭), G (G# or A♭) from its corresponding group below. PANTONE ® color codes are recognized for the accurate communication of color in many areas. PANTONE ® products are available from Pantone, Inc. of Carlstadt, NJ 07072.

| |
|---|
| 324 C, U, 325 C, U, 326 C, U, 327 C, U, 328 C, U, 329 C, U |
| 304 C, U, 305 C, U, 306 C, U, 308 C, U |
| 542 C, U, 543 C, U, 544 C, U, 545 C, U |
| 549 C, U, 550 C, U, 551 C, U, 552 C, U |
| 628 C, U, 629 C, U, 630 C, U, 631 C, U, 632 C, U, 633 C, U, 634 C, U |
| 635 C, U, 636 C, U, 637 C, U, 638 C, U, 639 C, U, 640 C, U, 641 C, U |
| 642 C, U, 643 C, U, 644 C, U, 645 C, U, 646 C, U |
| 649 C, U, 650 C, U, 651 C, U, 652 C, U |
| 656 C, U, 657 C, U, 658 C, U, 659 C, U, 660 C, U, 661 C, U |
| 801 C, U |
| 801 C, U, 2X |
| Hexachrome Cyan C, U |
| Process Blue C, U |
| Process Blue C, U, 2X |
| Process Cyan C, U |
| G# or Ab |
| (combination of the following two Sets A and B) |
| Set A |
| 2706 C, U, 2716 C, U |
| 2707 C, U, 2717 C, U, 2727 C, U |
| 2798 C, U, 2718 C, U |
| 277 C, U, 278 C, U, 279 C, U |
| 283 C, U, 284 C, U, 285 C, U |
| 290 C, U, 291, C, U, 292 C, U |
| 2905 C, U, 2915 C, U, 2925 C, U, 2935 C, U |
| 297 C, U, 298 C, U, 299 C, U, 300 C, U, 301 C, U |
| 297 C, U, 298 C, U, 299 C, U, 300 C, U |
| 2975 C, U, 2985 C, U, 2995 C, U, 3005 C, U |
| 299 C, U, 2X |
| 302 C, U, 2X |
| 312 C, U |
| 310 C, U, 311 C, U, 312 C, U, 313 C, U, 314 C, U, 315 C, U |
| 3105 C, U, 3115 C, U, 3125 C, U, 3135 C, U, 3145 C, U, 3155 C, U |
| 317 C, U, 318 C, U, 319 C, U, 320 C, U, 321 C, U, 322 C, U |
| 320 C, U, 2X |
| 324 C, U, 325 C, U, 326 C, U, 327 C, U, 328 C, U, 329 C, U |
| 304 C, U, 305 C, U, 306 C, U, 308 C, U |
| 542 C, U, 543 C, U, 544 C, U, 545 C, U |
| 549 C, U, 550 C, U, 551 C, U, 552 C, U |
| 628 C, U, 629 C, U, 630 C, U, 631 C, U, 632 C, U, 633 C, U, 634 C, U |
| 635 C, U, 636 C, U, 637 C, U, 638 C, U, 639 C, U, 640 C, U, 641 C, U |
| 642 C, U, 643 C, U, 644 C, U, 645 C, U, 646 C, U |
| 649 C, U, 650 C, U, 651 C, U, 652 C, U |
| 656 C, U, 657 C, U, 658 C, U, 659 C, U, 660 C, U, 661 C, U |
| 801 C, U |
| 801 C, U, 2X |
| Hexachrome Cyan C, U |
| Process Blue C, U |
| Process Blue C, U, 2X |
| Process Cyan C, U |
| Set B |
| 072 C, U |
| 2587 C, U, 2597 C, U, 2607 C, U, 2617 C, U |
| 2655 C, U, 2665 C, U |
| 266 C, U, 267 C, U, 268 C, U |
| 2685 C, U |
| 2715 C, U, 2725 C, U, 2735 C, U, 2745 C, U, 2755 C, U, 2765 C, U |
| 2716 C, U, 2726 C, U, 2736 C, U, 2746 C, U, 2756 C, U, 2766 C, U |
| 2718, C, U, 2728 C, U, 2738 C, U, 2748 C, U, 2758 C, U |
| 2727, C, U, 2747 C, U, 2757 C, U, 2767 C, U |

TABLE A-continued

| FIRST EMBODIMENT OF COLORS FOR MUSIC NOTATION, MUSICAL INSTRUMENTS, OVERLAYS, AND LIGHT DISPLAYS Whole, quarter and half notes in musical scores, the keys of musical instruments, student guides, and light displays are colored by selecting one PANTONE ® number for the whole and half tones A, (A# or B♭) B, C, (C# or D♭), D, (D# or E♭), E, F (F# or G♭), G (G# or A♭) from its corresponding group below. PANTONE ® color codes are recognized for the accurate communication of color in many areas. PANTONE ® products are available from Pantone, Inc. of Carlstadt, NJ 07072. |
|---|
| 2726 C, U, 2736 C, U, 2746 C, U, 2756 C, U |
| 2725 C, U, 2735 C, U, 2745 C, U, 2755 C, U |
| 270 C, U, 271 C, U, 272 C, U, 273 C, U, 274 C, U, 275 C, U |
| 279 C, U |
| 280 C, U, 281 C, U, 282 C, U |
| 285 C, U, 286 C, U, 287 C, U, 288 C, U, 289 C |
| 2935 C, U, 2945 C, U, 2955 C, U, 2965 C, U |
| 293 C, U, 294 C, U, 295 C, U, 296 C, U |
| 300 C, U, 301 C, U, 302 C, U, 303 C, U |
| 3015 C, U, 3025 C, U, 3035 C, U |
| 307 C, U, 308 C, U, 309 C, U |
| 5255 C, U, 5265 C, U, 5275 C, U |
| 533 C, U, 534 C, U |
| 539 C, U, 540 C, U, 541 C, U |
| 5395 C, U, 5405 C, U |
| 546 C, U, 547 C, U, 548 C, U |
| 5473 C, U, 5483 C, U |
| 634 C, U |
| 641 C, U |
| 647 C, U, 648 C, U |
| 653 C, U, 654 C, U, 655 C, U |
| 661 C, U, 662 C, U |
| 668 C, U, 669 C, U |
| 801 C, U |
| 801 C, U, 2X |
| 814 C, U |
| 814 C, U, 2X |
| Blue 072 C, U |
| Cyan C, U |
| Process Blue |
| Process Blue C, U |
| Process Blue C, U, 2X |
| Reflex Blue |
| Reflex Blue C, U |
| Reflex Blue C, U, 2X |
| Violet C, U |
| Violet C, U, 2X |
| A |
| 072 C, U |
| 2587 C, U, 2597 C, U, 2607 C, U, 2617 C, U |
| 2655 C, U, 2665 C, U |
| 266 C, U, 267 C, U, 268 C, U |
| 2685 C, U |
| 2715 C, U, 2725 C, U, 2735 C, U, 2745 C, U, 2755 C, U, 2765 C, U |
| 2716 C, U, 2726 C, U, 2736 C, U, 2746 C, U, 2756 C, U, 2766 C, U |
| 2718, C, U, 2728 C, U, 2738 C, U, 2748 C, U, 2758 C, U |
| 2727, C, U, 2747 C, U, 2757 C, U, 2767 C, U |
| 2726 C, U, 2736 C, U, 2746 C, U, 2756 C, U |
| 2725 C, U, 2735 C, U, 2745 C, U, 2755 C, U |
| 270 C, U, 271 C, U, 272 C, U, 273 C, U, 274 C, U, 275 C, U |
| 279 C, U |
| 280 C, U, 281 C, U, 282 C, U |
| 285 C, U, 286 C, U, 287 C, U, 288 C, U, 289 C |
| 2935 C, U, 2945 C, U, 2955 C, U, 2965 C, U |
| 293 C, U, 294 C, U, 295 C, U, 296 C, U |
| 300 C, U, 301 C, U, 302 C, U, 303 C, U |
| 3015 C, U, 3025 C, U, 3035 C, U |
| 307 C, U, 308 C, U, 309 C, U |
| 5255 C, U, 5265 C, U, 5275 C, U |
| 533 C, U, 534 C, U |
| 539 C, U, 540 C, U, 541 C, U |
| 5395 C, U, 5405 C, U |

TABLE A-continued

| FIRST EMBODIMENT OF COLORS FOR MUSIC NOTATION, MUSICAL INSTRUMENTS, OVERLAYS, AND LIGHT DISPLAYS Whole, quarter and half notes in musical scores, the keys of musical instruments, student guides, and light displays are colored by selecting one PANTONE ® number for the whole and half tones A, (A# or B♭) B, C, (C# or D♭), D, (D# or E♭), E, F (F# or G♭), G (G# or A♭) from its corresponding group below. PANTONE ® color codes are recognized for the accurate communication of color in many areas. PANTONE ® products are available from Pantone, Inc. of Carlstadt, NJ 07072. |
|---|
| 546 C, U, 547 C, U, 548 C, U |
| 5473 C, U, 5483 C, U |
| 634 C, U |
| 641 C, U |
| 647 C, U, 648 C, U |
| 653 C, U, 654 C, U, 655 C, U |
| 661 C, U, 662 C, U |
| 668 C, U, 669 C, U |
| 801 C, U |
| 801 C, U, 2X |
| 814 C, U |
| 814 C, U, 2X |
| Blue 072 C, U |
| Cyan C, U |
| Process Blue |
| Process Blue C, U |
| Process Blue C, U, 2X |
| Reflex Blue |
| Reflex Blue C, U |
| Reflex Blue C, U, 2X |
| Violet C, U |
| Violet C, U, 2X |
| A# or B♭ (combination of the following two Sets A and B) |
| Set A |
| 072 C, U |
| 2587 C, U, 2597 C, U, 2607 C, U, 2617 C, U |
| 2655 C, U, 2665 C, U |
| 266 C, U, 267 C, U, 268 C, U |
| 2685 C, U |
| 2715 C, U, 2725 C, U, 2735 C, U, 2745 C, U, 2755 C, U, 2765 C, U |
| 2716 C, U, 2726 C, U, 2736 C, U, 2746 C, U, 2756 C, U, 2766 C, U |
| 2718, C, U, 2728 C, U, 2738 C, U, 2748 C, U, 2758 C, U |
| 2727, C, U, 2747 C, U, 2757 C, U, 2767 C, U |
| 2726 C, U, 2736 C, U, 2746 C, U, 2756 C, U |
| 2725 C, U, 2735 C, U, 2745 C, U, 2755 C, U |
| 270 C, U, 271 C, U, 272 C, U, 273 C, U, 274 C, U, 275 C, U |
| 279 C, U |
| 280 C, U, 281 C, U, 282 C, U |
| 285 C, U, 286 C, U, 287 C, U, 288 C, U, 289 C |
| 2935 C, U, 2945 C, U, 2955 C, U, 2965 C, U |
| 293 C, U, 294 C, U, 295 C, U, 296 C, U |
| 300 C, U, 301 C, U, 302 C, U, 303 C, U |
| 3015 C, U, 3025 C, U, 3035 C, U |
| 307 C, U, 308 C, U, 309 C, U |
| 5255 C, U, 5265 C, U, 5275 C, U |
| 533 C, U, 534 C, U |
| 539 C, U, 540 C, U, 541 C, U |
| 5395 C, U, 5405 C, U |
| 546 C, U, 547 C, U, 548 C, U |
| 5473 C, U, 5483 C, U |
| 634 C, U |
| 641 C, U |
| 647 C, U, 648 C, U |
| 653 C, U, 654 C, U, 655 C, U |
| 661 C, U, 662 C, U |
| 668 C, U, 669 C, U |
| 801 C, U |
| 801 C, U, 2X |
| 814 C, U |
| 814 C, U, 2X |

TABLE A-continued

| FIRST EMBODIMENT OF COLORS FOR MUSIC NOTATION, MUSICAL INSTRUMENTS, OVERLAYS, AND LIGHT DISPLAYS Whole, quarter and half notes in musical scores, the keys of musical instruments, student guides, and light displays are colored by selecting one PANTONE ® number for the whole and half tones A, (A# or B♭) B, C, (C# or D♭), D, (D# or E♭), E, F (F# or G♭), G (G# or A♭) from its corresponding group below. PANTONE ® color codes are recognized for the accurate communication of color in many areas. PANTONE ® products are available from Pantone, Inc. of Carlstadt, NJ 07072. |
|---|
| Blue 072 C, U |
| Cyan C, U |
| Process Blue |
| Process Blue C, U |
| Process Blue C, U, 2X |
| Reflex Blue |
| Reflex Blue C, U |
| Reflex Blue C, U, 2X |
| Violet C, U |
| Violet C, U, 2X |
| Set B |
| 169 C, U, 170 C, U |
| 176 C, U, 177 C, U, 178 C, U |
| 1765 C, U, 1775 C, U, 1785 C, U |
| 1767 C, U, 1777 C, U, 1787 C, U |
| Red O32 C, U |
| 182 C, U, 183 C, U, 184 C, U |
| 189 C, U, 190 C, U, 191 C, U |
| 1895 C, U, 1905 C, U, 1915 C, U |
| 196 C, U, 197 C, U, 198 C, U |
| 203 C, U, 204 C, U, 205 C, U |
| 210 C, U, 211 C, U, 212 C, U, 213 C, U, 214 C, U |
| 217 C, U, 218 C, U, 219 C, U |
| 223 C, U, 224 C, U, 225 C, U, 226 C, U |
| 230 C, U, 231 C, U, 232 C, U, 233 C, U |
| 236 C, U, 237 C, U, 238 C, U, 239 C, U, 240 C, U, 241 C, U |
| 2365 C, U, 2375 C, U, 2385 C, U, 2395 C, U, 2405 C, U |
| 243 C, U, 244 C, U, 245 C, U, 246 C, U, 247 C, U, 248 C, U |
| 250 C, U, 251 C, U, 252 C, U, 253 C, U, 254 C, U |
| 256 C, U, 257 C, U, 258 C, U |
| 2562 C, U, 2572 C, U, 2582 C, U, 2592 C, U, 2602 C, U |
| 2563 C, U, 2573 C, U, 2583 C, U, 2593 C, U, |
| 2603 C, U, 2613 C, U, 2623 C, U |
| 263 C, U, 264 C, U, 265 C, U |
| 2635 C, U, 2645 C, U, 2655 C, U |
| 2567 C, U, 2577 C, U, 2587 C, U, 2597 C, U |
| 487 C, U, 488 C, U, 489 C, U |
| 493 C, U, 494 C, U, 495 C, U, 496 C, U |
| 500 C, U, 501 C, U, 502 C, U, 503 C, U |
| 4995 C, U, 5005 C, U, 5015 C, U, 5025 C, U, 5035 C, U |
| 507 C, U, 508 C, U, 509 C, U, 510 C, U |
| 512 C, U, 513 C, U, 514 C, U, 515 C, U, 516 C, U, 517 C, U |
| 5135 C, U, 5145 C, U, 5155 C, U, 5165 C, U, 5175 C, U |
| 521 C, U, 522 C, U, 523 C, U, 524 C, U |
| 528 C, U, 529 C, U, 530 C, U, 531 C, U |
| 670 C, U, 671 C, U, 672 C, U, 673 C, U, 674 C, U, 675 C, U, 676 C, U |
| 677 C, U, 678 C, U, 679 C, U, 680 C, U, 681 C, U, 682 C, U |
| 684 C, U, 685 C, U, 686 C, U, 687 C, U, 688 C, U, 689 C, U |
| 691 C, U, 692 C, U, 693 C, U, 694 C, U, 695 C, U |
| 698 C, U, 699 C, U, 700 C, U, 701 C, U, 702 C, U, 703 C, U |
| 705 C, U, 706 C, U, 707 C, U, 708 C, U, 709 C, U, 710 C, U, 711 C, U |
| 806 C |
| 807 C |
| 806 C, U, 2X |
| 807 C, U, 2X |
| 812 C |
| 813 C |
| 812 C, U, 2X |
| 813 C, U, 2X |
| Hexachrome Magenta C, U |
| Magenta C, U |
| Process Magenta C, U |

TABLE A-continued

| FIRST EMBODIMENT OF COLORS FOR MUSIC NOTATION, MUSICAL INSTRUMENTS, OVERLAYS, AND LIGHT DISPLAYS Whole, quarter and half notes in musical scores, the keys of musical instruments, student guides, and light displays are colored by selecting one PANTONE ® number for the whole and half tones A, (A# or B♭) B, C, (C# or D♭), D, (D# or E♭), E, F (F# or G♭), G (G# or A♭) from its corresponding group below. PANTONE ® color codes are recognized for the accurate communication of color in many areas. PANTONE ® products are available from Pantone, Inc. of Carlstadt, NJ 07072. |
|---|
| Purple C, U |
| Rhodamine Red C, U |
| Rubine Red C, U |
| Rubine Red C, U, 2X |
| Violet C, U |
| Warm Red C, U, 2X |
| B |
| 169 C, U, 170 C, U |
| 176 C, U, 177 C, U, 178 C, U |
| 1765 C, U, 1775 C, U, 1785 C, U |
| 1767 C, U, 1777 C, U, 1787 C, U |
| Red O32 C, U |
| 182 C, U, 183 C, U, 184 C, U |
| 189 C, U, 190 C, U, 191 C, U |
| 1895 C, U, 1905 C, U, 1915 C, U |
| 196 C, U, 197 C, U, 198 C, U |
| 203 C, U, 204 C, U, 205 C, U |
| 210 C, U, 211 C, U, 212 C, U, 213 C, U, 214 C, U |
| 217 C, U, 218 C, U, 219 C, U |
| 223 C, U, 224 C, U, 225 C, U, 226 C, U |
| 230 C, U, 231 C, U, 232 C, U, 233 C, U |
| 236 C, U, 237 C, U, 238 C, U, 239 C, U, 240 C, U, 241 C, U |
| 2365 C, U, 2375 C, U, 2385 C, U, 2395 C, U, 2405 C, U |
| 243 C, U, 244 C, U, 245 C, U, 246 C, U, 247 C, U, 248 C, U |
| 250 C, U, 251 C, U, 252 C, U, 253 C, U, 254 C, U |
| 256 C, U, 257 C, U, 258 C, U |
| 2562 C, U, 2572 C, U, 2582 C, U, 2592 C, U, 2602 C, U |
| 2563 C, U, 2573 C, U, 2583 C, U, 2593 C, U, |
| 2603 C, U, 2613 C, U, 2623 C, U |
| 263 C, U, 264 C, U, 265 C, U |
| 2635 C, U, 2645 C, U, 2655 C, U |
| 2567 C, U, 2577 C, U, 2587 C, U, 2597 C, U |
| 487 C, U, 488 C, U, 489 C, U |
| 493 C, U, 494 C, U, 495 C, U, 496 C, U |
| 500 C, U, 501 C, U, 502 C, U, 503 C, U |
| 4995 C, U, 5005 C, U, 5015 C, U, 5025 C, U, 5035 C, U |
| 507 C, U, 508 C, U, 509 C, U, 510 C, U |
| 512 C, U, 513 C, U, 514 C, U, 515 C, U, 516 C, U, 517 C, U |
| 5135 C, U, 5145 C, U, 5155 C, U, 5165 C, U, 5175 C, U |
| 521 C, U, 522 C, U, 523 C, U, 524 C, U |
| 528 C, U, 529 C, U, 530 C, U, 531 C, U |
| 670 C, U, 671 C, U, 672 C, U, 673 C, U, 674 C, U, 675 C, U, 676 C, U |
| 677 C, U, 678 C, U, 679 C, U, 680 C, U, 681 C, U, 682 C, U |
| 684 C, U, 685 C, U, 686 C, U, 687 C, U, 688 C, U, 689 C, U |
| 691 C, U, 692 C, U, 693 C, U, 694 C, U, 695 C, U |
| 698 C, U, 699 C, U, 700 C, U, 701 C, U, 702 C, U, 703 C, U |
| 705 C, U, 706 C, U, 707 C, U, 708 C, U, 709 C, U, 710 C, U, 711 C, U |
| 806 C |
| 807 C |
| 806 C, U, 2X |
| 807 C, U, 2X |
| 812 C |
| 813 C |
| 812 C, U, 2X |
| 813 C, U, 2X |
| Hexachrome Magenta C, U |
| Magenta C, U |
| Process Magenta C, U |
| Purple C, U |
| Rhodamine Red C, U |

TABLE A-continued

| FIRST EMBODIMENT OF COLORS FOR MUSIC NOTATION, MUSICAL INSTRUMENTS, OVERLAYS, AND LIGHT DISPLAYS<br>Whole, quarter and half notes in musical scores, the keys of musical instruments, student guides, and light displays are colored by selecting one PANTONE ® number for the whole and half tones A, (A# or B♭) B, C, (C# or D♭), D, (D# or E♭), E, F (F# or G♭), G (G# or A♭) from its corresponding group below. PANTONE ® color codes are recognized for the accurate communication of color in many areas. PANTONE ® products are available from Pantone, Inc. of Carlstadt, NJ 07072. |
|---|
| Rubine Red C, U |
| Rubine Red C, U, 2X |
| Violet C, U |
| Warm Red C, U, 2X |

TABLE B

SECOND EMBODIMENT OF COLORS FOR MUSICAL NOTATION, MUSICAL INSTRUMENTS, OVERLAYS, AND LIGHT DISPLAYS
Whole, quarter and half notes in musical scores, the keys of musical instruments, student guides, and light displays are colored by selecting the color for the whole and half tones A, (A♯ or B♭) B, C, (C♯ or D♭), D, (D♯ or E♭), E, F (F♯ or G♭), G (G♯ or A♭) from its corresponding group below.

| Note | White Key Color | Black Key Colors |
|---|---|---|
| G♯ or Ab | | purple and green |
| G | purple | |
| F♯ or Gb | | blue and purple |
| F | blue | |
| E | orange | |
| D♯ or Eb | | brown and orange |
| D | brown | |
| C♯ or Db | | yellow and brown |
| C | yellow | |
| B | red | |
| A♯ or Bb | | green and red |
| A | green | |

While the preferred embodiment of the musical color notation according to the present invention has been illustrated and described, it will be appreciated that various changes can be made therein without departing from the spirit and scope of the invention. For example, keyboards may be produced in varying shades of the basic colors to meet the different preferences of musicians. Also, the colors and patterns may be modified to meet the needs of color-blind or other visually-impaired individuals.

System Apparatus

Figure 23:
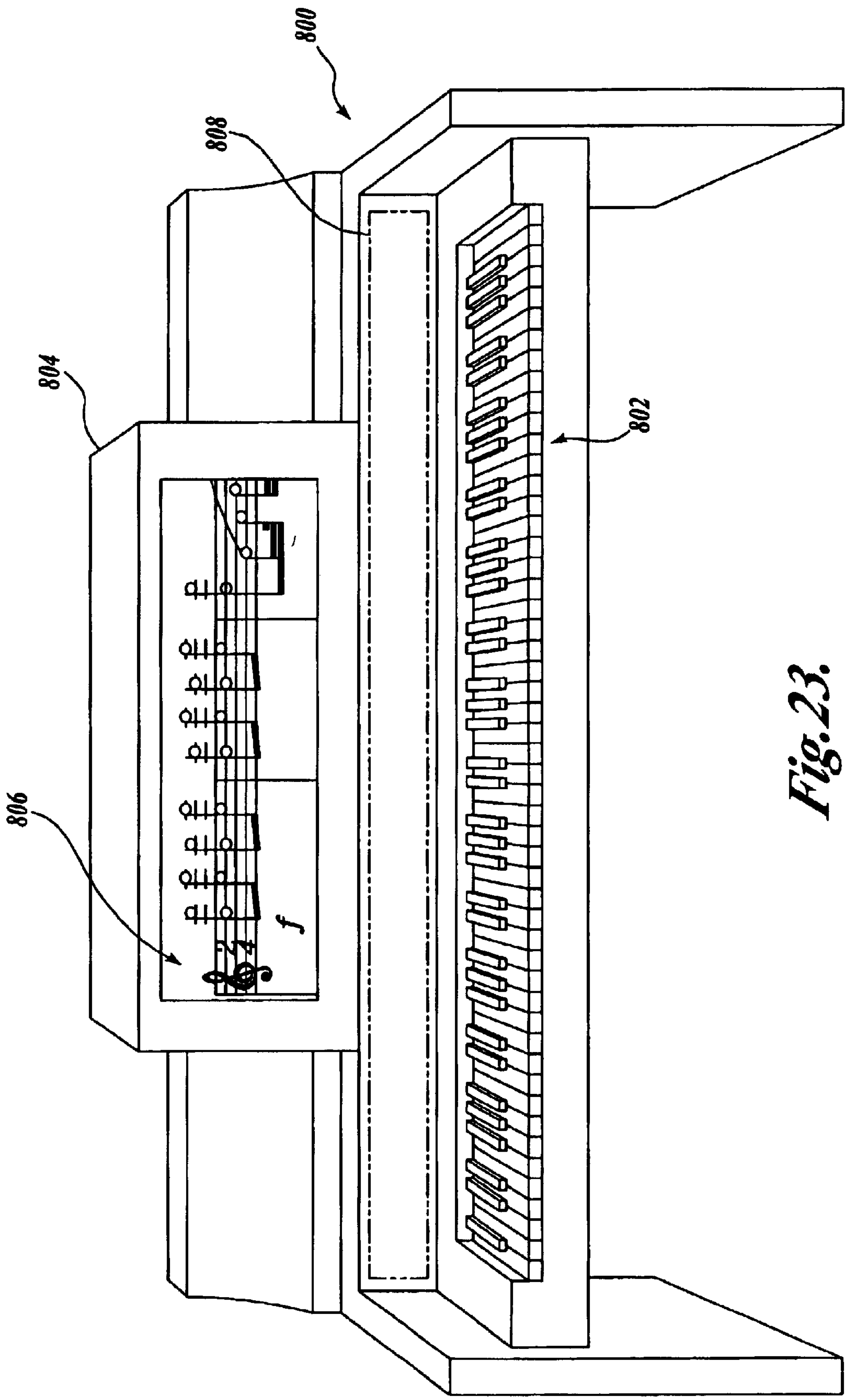
FIG. 23 is a schematic illustration of system apparatus for playing music according to the present invention.

Referring now to FIG. 23, the components of a system for playing music with a multi-colored musical score and musical instrument are illustrated. System apparatus includes a keyboard instrument 800 having a keyboard 802 and a multi-colored musical score 806, utilizing the master color matrices of Table A or Table B. The system further includes a student guide 808, previously described.

Figure 24:
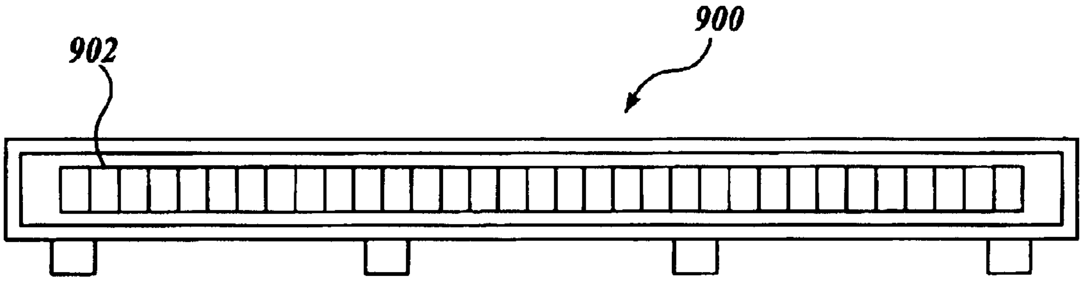
FIG. 24 is a schematic illustration of a color light display device according to the present invention.
Figure 25:
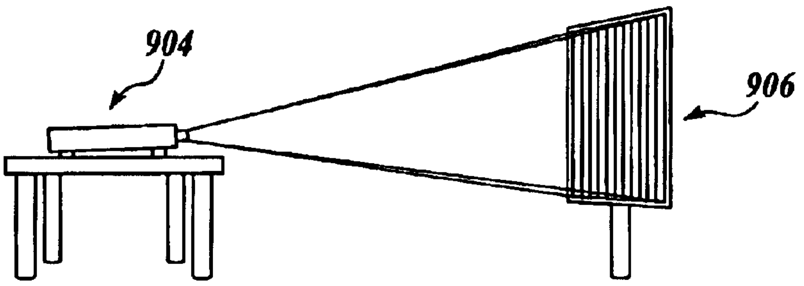
FIG. 25 is a schematic illustration of a color light display projector and screen according to the present invention.

As described by FIG. 26, reference numeral 1032 and as further illustrated by FIG. 24 the display module includes a keyboard to generate output to a color light display unit 900 to create a correlating colored light display 902 in the same colors as the notes played according to the colorized musical score of the present invention. Alternatively, this output can be directed to a projection unit 904 to produce a correlating color light display 906 in the same colors as the notes played according to the colorized musical score of the present invention as illustrated in FIG. 25 and as shown in FIG. 26, reference numeral 1034. The projected images provide enhanced viewing by an audience to a musical performance. Finally, as further illustrated by FIG. 26 the computing device may be capable of executing computer readable instructions for producing an audio version of a colored musical score that can be transmitted through speakers 1038.

The present invention can optionally include the use of a specially designed linear music display monitor 804 to display music converted from standard format to the linear format described below or colorized musical scores converted from black and white scores according to the method of the present invention. The specially designed linear music display monitor 804 will allow a continual line of music to scroll before a user from the beginning to the end of the score. Once a user has selected a particular music score to view on the specially designed linear music display monitor 804, the user will be able to greatly expand the staffs of music from the score rather than viewing one or two pages of very small musical notes at a time. This is a distinct advantage over conventional sheet music. In the present invention, the expanded musical score in the linear format will pass before the user's eyes at a pace suitable to the user's playing ability. The user may control the speed of scrolling through a control located either on the display screen itself or on two foot pedals which function similarly to automobile accelerator and brake pedals. To increase scrolling speed, a user will press the right foot pedal until the desired speed is achieved. When the pedal is released, it will maintain the speed. To slow the speed of scrolling, the user will press the left foot brake pedal until the desired speed is reached and the foot pedal is released. Alternatively, a user can elect to view only a single stationary section of a score. By using a switch on the display screen, the user can then advance to the next section of the score.

Referring now to FIG. 26, the present invention can optimally include the use of a remote video display screen 1026 placed near a musician such as an orchestra member for directly viewing and performing a colored musical score, or a similar apparatus 1012 placed on a keyboard instrument.

Referring now to FIGS. 24 and 25, the colored light display unit 900 and/or colored light projection unit 904 may be used as display options in the present invention as also shown by FIG. 26, 1032 and 1034. This aspect of the system provides additional entertainment value for the audience by electronically linking the keys played on a standard keyboard musical instrument 1024, to a series of 88 lights, one for each key of a standard keyboard musical instrument, such as a piano. The lights displayed will conform to the colors of each key depressed by the musician according to the master color matrices of Tables A and B, although it is permissible for the shades of the colors to vary. As illustrated in FIG. 24, when the musician depresses a key on a keyboard musical instrument linked to either a colored light display unit 900 or a colored light projection unit 906, whether alone or in chords, corresponding colored lights will be illuminated on a linear screen 902, or projected onto a screen 906 or other apparatus. This will create a unique light display in the signature of the colored musical score being played.

Again referring to FIG. 26, all or part of the apparatus and methods necessary to carry out the present invention may be combined into one stand-alone unit called a color music entertainment center composed of the apparatus shown as 1002, 1004, 1012, 1014, 1036, and 1038. The user of such a stand alone unit will be able to scan in black and white printed music, convert it into colored musical scores according to the present invention in either standard or linear format, save the resulting data to a computer-readable medium, and reproduce it on a compact disk, or as a printed colored version of the original score. The stand alone unit also can be enabled to transmit the colorized music scores to remote display devices according to the present invention, to receive new musical scores from compact disks, and to play musical scores received from a compact disk through attached or remote speakers 1038. Preferably, the features of this color music entertainment center can be combined into an device that is approximately the same size as a "footprint" occupied by many conventional flatbed scanners with the additional mass of printing and computing devices "stacked" below. Optimally, it can include a detachable display screen affixed to the unit's front. Because the system of the present invention emphasizes color, preferably the color music entertainment center can be contained within colored cabinets, or, alternatively, within high gloss black or other appropriately finished cabinets to coordinate with standard pianos and other musical instruments.

System Methods

Figure 35:
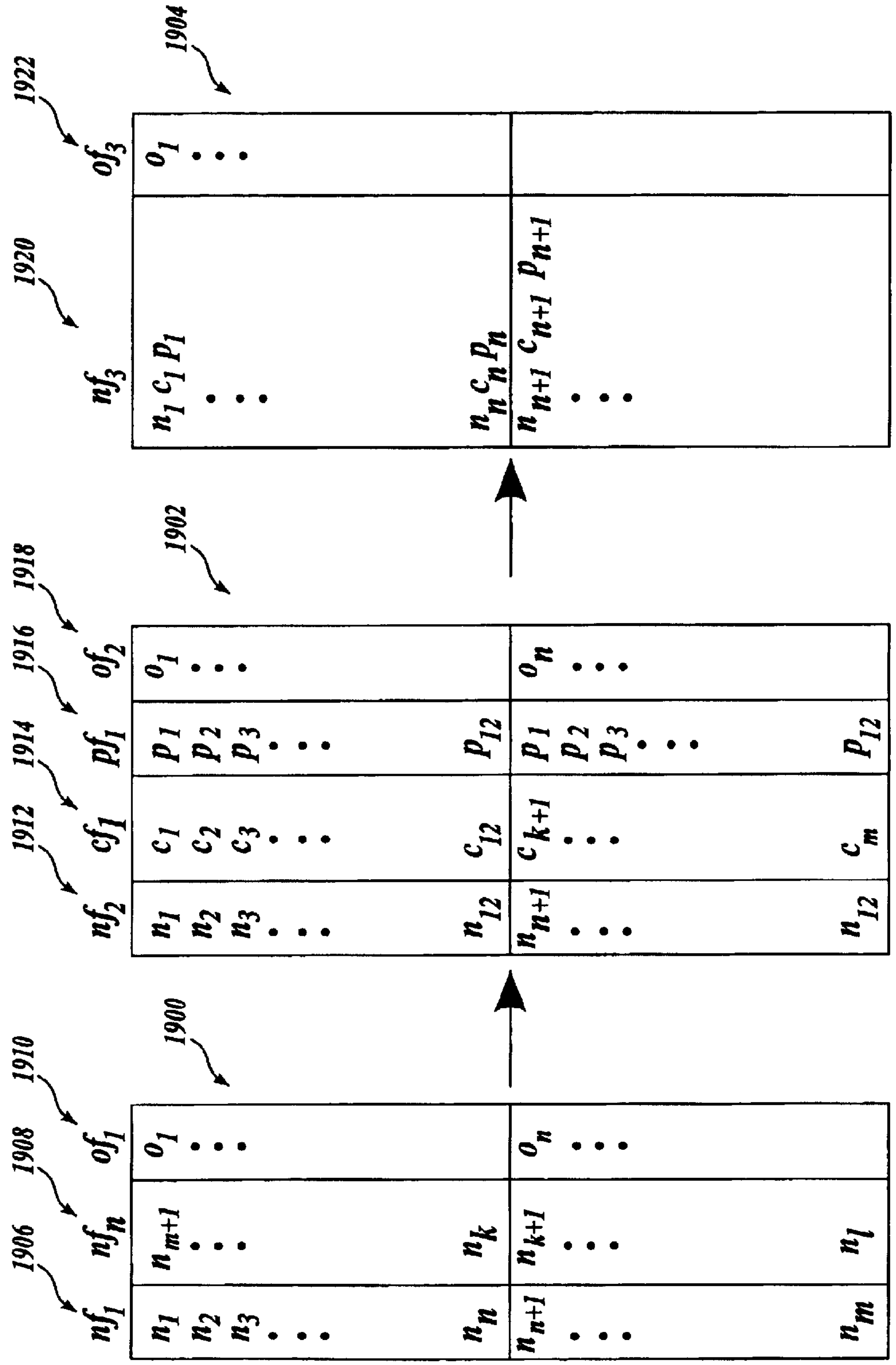
FIG. 35 is a schematic illustration of data structures used according to the present invention.

Referring to FIG. 35, data structures 1900, 1902, 1904 are illustrated which enable the method of colorization of black and white music scores into color music scores according to the present invention. Music can be in sheet or digital format. Database 1900 includes a first note field 1906 including one or a plurality of notes. Data structure 1900 can include one or a plurality of note fields as designated by reference numeral 1908 to correlate to each note column 1402, 1404, FIG. 30, on a staff. The note fields 1906 and 1908 contain the black and white notes from a black and white musical score. Data structure 1900 optionally may include a first octave field designated as 1910 if it is desired to color each octave in more than 7 different colors. Data structure 1902 includes a second note field designated 1912, including the 12 notes. Data structure 1902 also includes a first color field designated by reference numeral 1914 to color notes matched from field 1906. The first color field includes 12 colors that correlate with the 12 notes of note field 1912. It should be readily apparent that the color field 1914 includes colors selected from the Tables A or B. A color element in the color field 1914 can also include the set of binary colors for a half tone. Data structure 1902 also includes a pattern field designated by reference numeral 1916 to pattern notes matched from field 1906. Data structure 1902 optionally includes a second octave field designated by reference numeral 1918 to provide different colors for the notes in field 1912 for every octave. For example, colorizing the 88 keys of a standard keyboard, wherein each key is colored differently for every octave. Data structure 1904 includes a third note field designated by reference numeral 1920 to provide the newly colored and patterned notes from field 1906 and optionally a third octave field if selecting to color each note in each octave color a different color.

Figure 38:
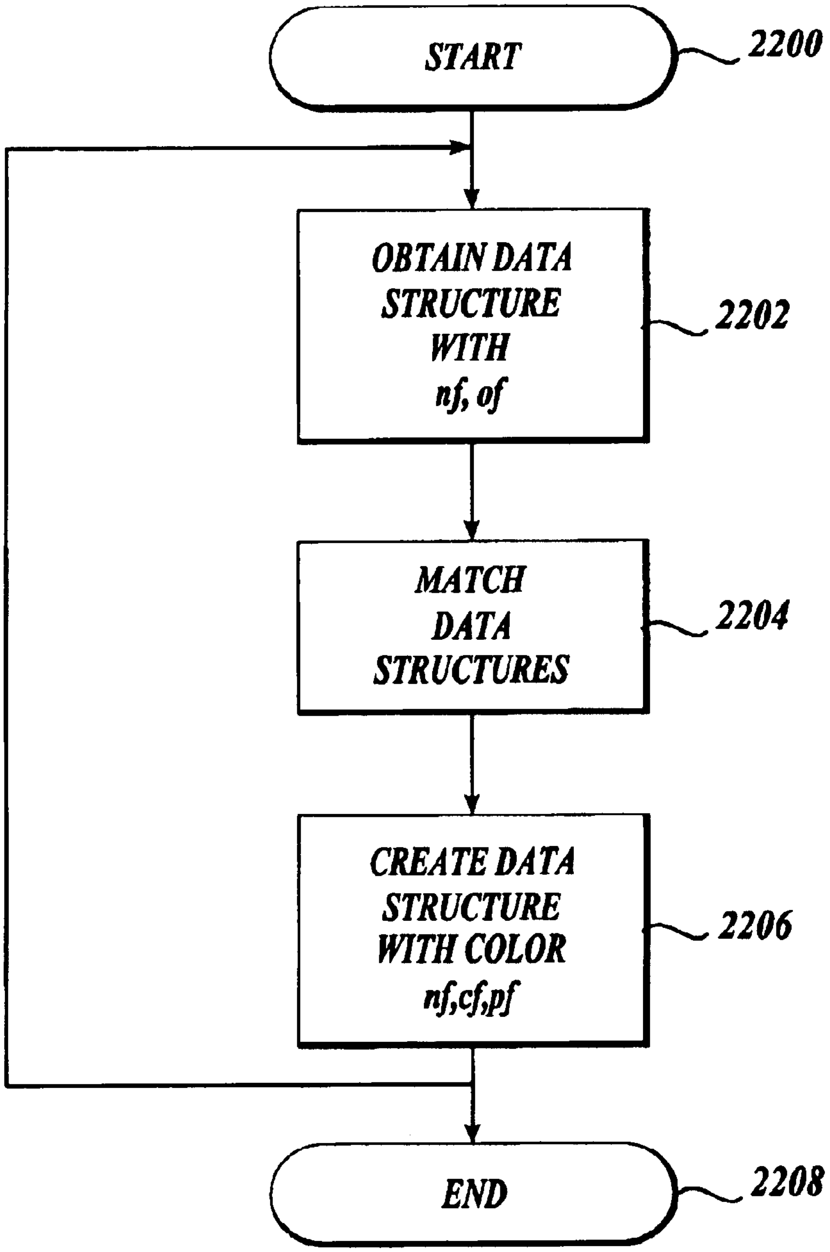
FIG. 38 is a block diagram of a method for linearizing conventional multi-staffed sheet music into linear sheet music according to the present invention.

Referring now to FIG. 38, a method for colorizing black and white musical scores into colorized musical scores is illustrated. The method starts in block 2200. In block 2202, data structures are obtained which have a note field operable to contain black and white notes and optionally include an octave field operable to be matched with notes, if desired to color each note of each octave a different color. The note field of block 2202 are the notes which are aligned vertically, as better illustrated in FIG. 30 by reference numeral 1402 and 1404. In block 2204, the data structure 1900 and the data structure 1902 are matched so that a note from note field 1906 is matched with a note from the second note field 1912. Optionally, the notes can be matched by note and by octave. In block 2206, the data structure 1904 is created with a new note field 1920 containing the note from note field 1906 with a color selected from the color field 1914 and the pattern field 1916 and optionally can also be grouped according by octaves 1922. The method can return to block 2202 where a second musical score is scanned to obtain a new data structure and the method continues. The new data structure 2012 can be copied, transferred, stored, saved, displayed, or otherwise electronically manipulated by the system apparatus according to the present invention. Otherwise, the method ends in block 2208.

Figure 36:
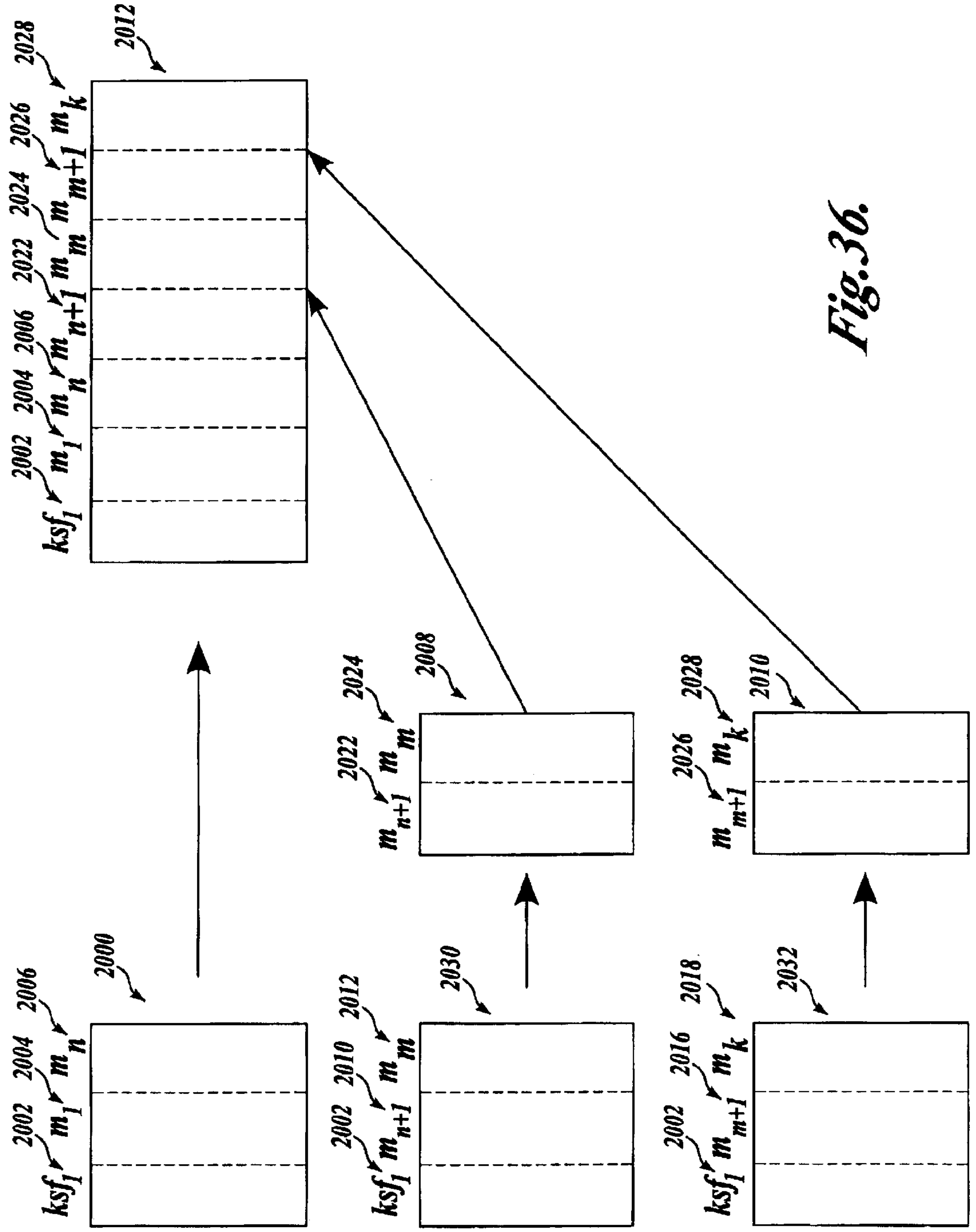
FIG. 36 is a schematic illustration of data structures used according to the present invention.

Referring now to FIG. 36, data structures for carrying out a method of linearizing sheet or digitized music having more than one staff into sheet or digitized linear music with a single staff are illustrated. Data structures 2000, 2030, and 2032 are representative of staffs on a music score. The data structures include a key signature field designated by reference numeral 2002. The key signature field 2002 includes timing and key designations. In standard music notation, key signatures appear at the beginning of each staff or grand staff. It should be apparent that more or less staffs can be used according to the present invention than those shown in the FIG. 36. Data structures 2000, 2012, and 2018 also include measure fields operable to contain one or a plurality of notes or other musical notation found in music scores. Data structure 2008 is the data structure of 2030 with the redundant key signature 2002 removed. Data structure 2010 is the data structure 2032 with the redundant key signature 2002 removed. Key signatures 2000, 2030, and 2032 contain the information that is found in conventional music scores at the beginning of each staff. Data structure 2012 shows a data structure used in the present invention for producing linearized sheet music. Data structure 2012 includes a key signature field 2002 which is a key signature field from data structure 2000 which is not redundant, but was removed from data structures 2030 and 2032 because there, it is redundant. Data structure 2012 also includes the measure fields of data structures 2000, 2030, and 2032 without the redundant key signatures.

Figure 37:
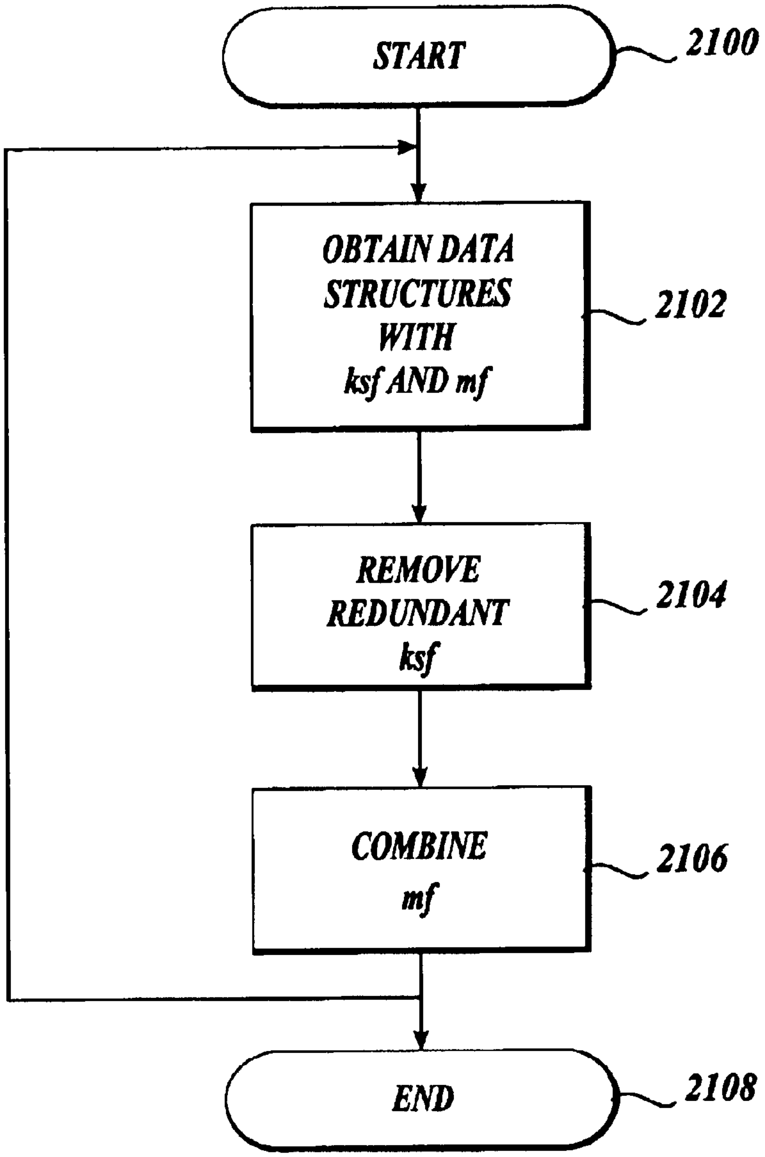
FIG. 37 is a block diagram of a method for colorizing black and white notes into colored notes according to the present invention.

Referring now to FIG. 37, a method for linearizing sheet or digitized music having multiple staffs into a linear sheet or digitized music score is illustrated. The method starts in block 2100. In block 2102, data structures are obtained that have a key signature field which is operable to contain timing and key designations and a measure field which is operable to contain notes from a multiple staffed sheet music score. It should be apparent that the key signature field can include more or less designators. In block 2104, any redundancies, such as key signatures found in the key signature fields are removed. In block 2106 the data structures obtained in block 2102 are combined to form a new data structure having a linear format. The data structure 2012 can be in sheet or digitized format, and can be copied, transferred, saved, stored, displayed or otherwise manipulated via system apparatus according to the present invention. The method can return to block 2102 where a new multi-staffed music score is scanned to obtain the data structures. The method can continue in the usual way to remove redundancies and combine the data structures. Otherwise, the method can terminate in block 2108.

It should be readily apparent that the methods illustrated in FIGS. 37 and 38 can be performed independently, concurrently, or sequentially in a computer system to provide colorized and/or linearized musical scores, or both. It should also be readily apparent that the data structures 1904 containing the information for a colorized musical score and the data structure 2012 containing the information for a linearized musical score can be stored electronically in a computer readable medium, transferred via a communications medium, transferred to a display device to be viewed by a user of the system and copied or downloaded by a user connected via a communications medium.

The computer system for carrying out the methods according to the present invention will be further discussed below along with more specific embodiments of the methods for linearization and colorization.

Referring to FIG. 26, a suitable computer system for carrying out the present invention includes a scanner 1002, a computing device 1004, a printing module 1010, a display module 1018, a file storage module 1036, and a file transfer module 1006. The computer system executes steps or routines for converting black and white musical scores to colored musical scores that may be stored in a computer-readable medium, printed, electronically transmitted, and displayed in either a standard or linear colorized format to correlate with colored overlays for facilitating the playing of music on keyboards and other musical instruments. The system includes a scanning engine 1002 to scan a black and white musical score 1000. The scanning engine 1002 according to the invention is capable of scanning, storing, and first order pre-processing correction of printed black and white sheet music 1000. The scanning engine 1002 is TWAIN compliant and provides a set of API's for the user interface. The scanning engine 1002 provides clean-up and general filtering to ensure optimum image reproduction, and is capable of accepting images scanned in black and white or in color. The preferred scanning engine will include options to modify scaling, resolution, and correction for different media types such as glossy and matte paper, and allow preview and selection of specific portions of the scanned image. This engine should be capable of saving scanned images into 'loss-less' formats such as TIFF without precluding other image format or intermediate conversion to non-graphical formats. The scanning engine 1002 should support batch processing, and the ability, with appropriate hardware support, to batch process the scanning and storage of images for later retrieval and color conversion by the computing device 1004.

Figure 27:
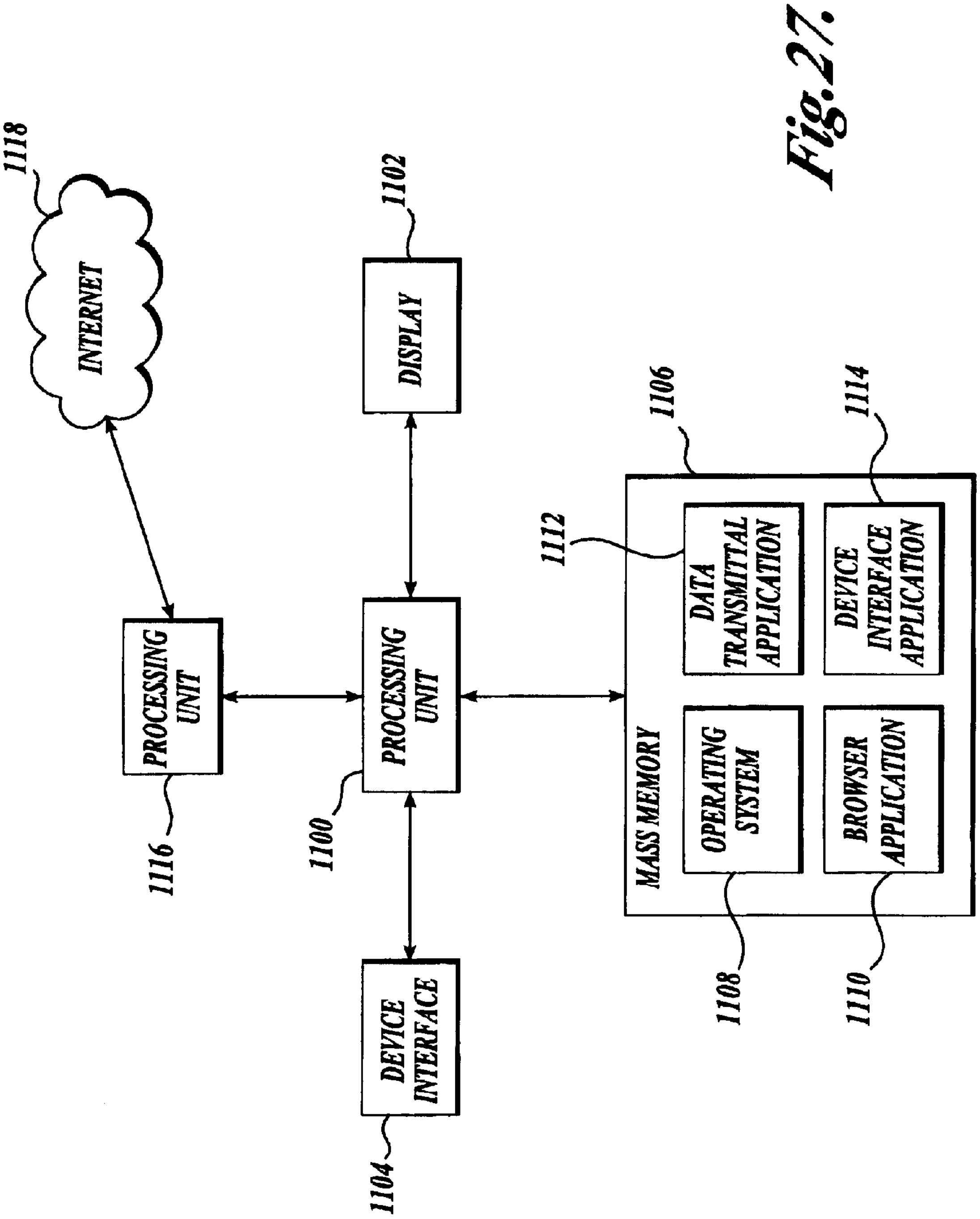
FIG. 27 is a schematic illustration of a computing device.

Referring still to FIG. 26, the scanning engine 1002 is connected to a computing device 1004 that presents various graphical user interfaces in accordance with the present invention. The interfaces provide the user with the ability to store the scanned images, transmit, print, or display, or otherwise manipulate the data files containing the color music score in print module 1010, display module 1018, file transfer module 1006, or file storage module 1036. Referring momentarily to FIG. 27, a suitable computing device 1004 for use in the present invention includes a processing unit 1100, a display 1102, and a mass memory 1106, and one or a plurality of device interfaces 1104, all connected via a communication SLS, or other communication device. The mass memory 1106 generally includes a RAM, ROM, and a permanent mass storage device, such as a hard disk drive, tape drive, optical drive, floppy disk drive, or combination thereof, capable of archiving data such as the color music score files created according to the colorization and linearization routines of the present invention illustrated by FIGS. 29–33 for future retrieval. The mass memory 1106 also stores an operating system 1108 for controlling the operation of the computing device. It will be appreciated that this component may include a general-purpose operating system as is known to those skilled in the art, such as UNIX, LINUX™, or Microsoft WINDOWS NT®. The computing device 1004 is capable of executing the colorization and linearization routines of the present invention illustrated by FIGS. 29–33. The memory 1106 of the computing device in FIG. 27 also includes a WWW browser 1110, such as Netscape's NAVIGATOR® or Microsoft's Internet Explorer browsers, for accessing the World Wide Web (the "WWW" or "web"). The computing device 1004 also includes a device interface application 1114 for driving printers, scanners, speakers, mass storage devices, and the like, and a data transmittal application 1112 for sending files to a server computer 1116. The server computer 1116 serves to connect to the communications medium 1118, such as the Internet. Those of ordinary skill in the art will appreciate that the computing device 1004 may include more or less components than those shown in FIG. 27. However, it is not necessary that all of these generally conventional components be shown in order to disclose an enabling embodiment for practicing the present invention.

Referring now to FIG. 26, the computing device 1004 includes a network interface 1006 for connecting directly to a Local Area network (hereinafter "LAN") or a Wide Area Network (hereinafter "WAN"), or for connecting remotely to a LAN or WAN. The computing device of the present invention may also be connected to other computing devices directly or by the LAN or WAN. Those of ordinary skill in the art will appreciate that the network interface 1006 includes the necessary circuitry for such a connection, and is also constructed for use with the TCP/IP protocol, the particular network configuration of the LAN or WAN it is connecting to, and a particular type of coupling medium. The computing device 1004 may also be equipped with a modem for connecting to the Internet 1008 through a point-point protocol ("PPP") connection or a serial line Internet protocol ("SLIP") connection as known to those skilled in the art.

Figure 28:
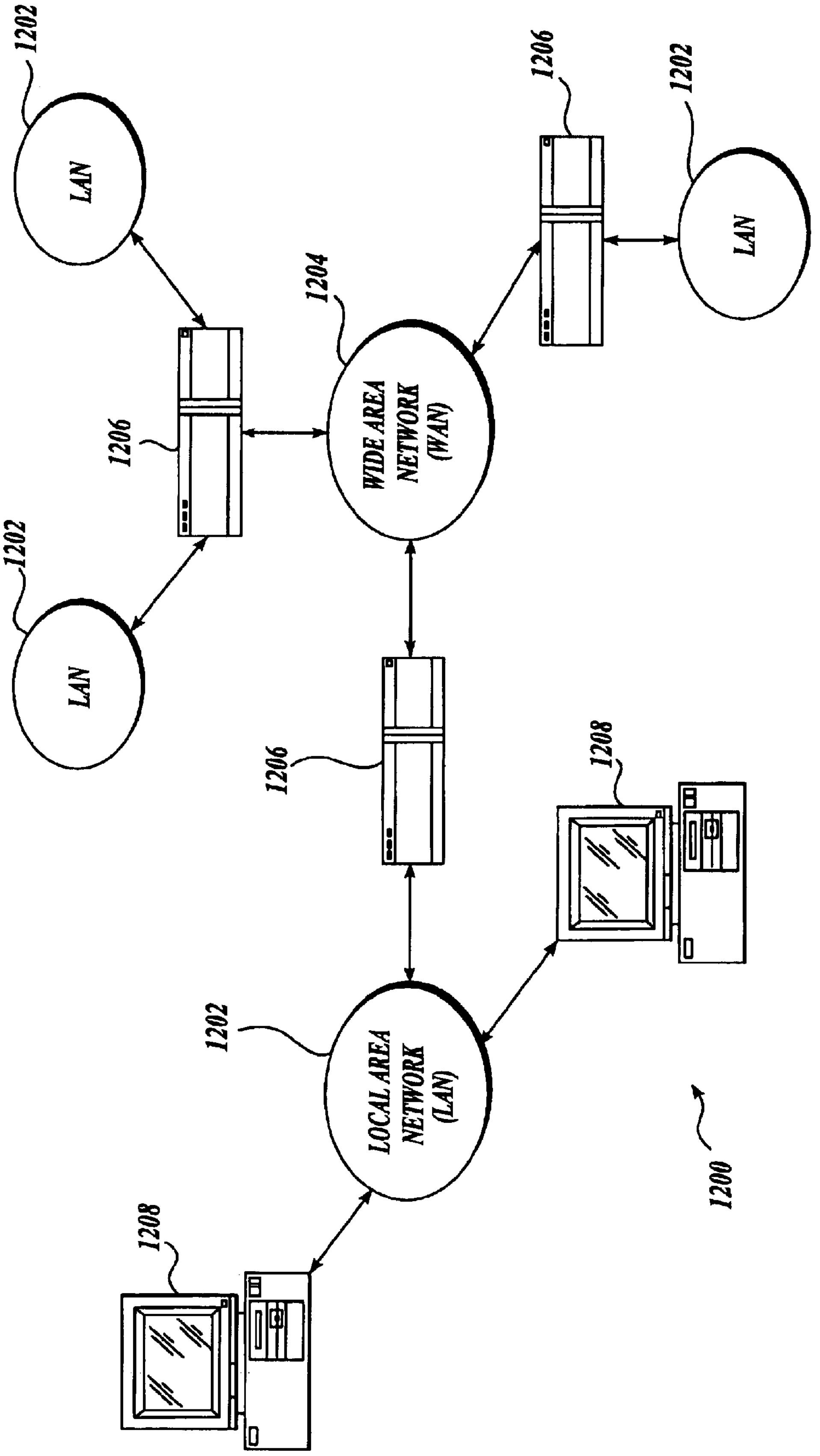
FIG. 28 is a schematic illustration of a portion of the Internet.

The present invention includes the ability to transmit colorized music through electronic communications systems or via a World Wide Web (the "WWW" or "web") site accessible via the Internet 1008. As is well known to those skilled in the art, the term "Internet" refers to the collection of networks and routers that use the Transmission Control Protocol/Internet Protocol ("TCP/IP") to communicate with one another. A representative section of the Internet 1200 is shown in FIG. 28, in which a plurality of local area networks ("LANs") 1202 and a wide area network ("WAN") 1204 are interconnected by routers 1206. The routers 1206 are special purpose computers used to interface one LAN or WAN to another. Communication links within the LANs may be twisted wire pair, or coaxial cable, while communication links between networks may utilize 58 Kbps analog telephone lines, 1 Mbps digital T-1 lines, 45 Mbps T-3 lines or other communications links known to those skilled in the art. Furthermore, computers 1208 and other related electronic devices can be remotely connected to either the LANs 1202 or the WAN 1204 via a modem and temporary telephone or wireless link. It will be appreciated that the Internet 1200 in FIG. 28 comprises a vast number of such interconnected networks, computers, and routers and that only a small, representative section of the Internet 1200 is shown in FIG. 28. One skilled in the relevant art will appreciate that aspects of the present invention may be practiced on Internet networks, such as an Intranet The Internet has recently seen explosive growth by virtue of its ability to link computers located throughout the world. As the Internet has grown, so has the WWW. As is appreciated by those skilled in the art, the WWW is a vast collection of interconnected or "hypertext" documents written in HyperText Markup Language ("HTML"), or other markup languages, that are electronically stored at "WWW sites" or "Web sites" throughout the Internet. A WWW site is a server connected to the Internet that has mass storage facilities for storing hypertext documents and that runs administrative software for handling requests for those stored hypertext documents. A hypertext document normally includes a number of hyperlinks, i.e., highlighted portions of text which link the document to another hypertext document possibly stored at a WWW site elsewhere on the Internet. Each hyperlink is associated with a Uniform Resource Locator ("URL") that provides the exact location of the linked document on a server connected to the Internet and describes the document. Thus, whenever a hypertext document is retrieved from any WWW server, the document is considered to be retrieved from the WWW. As is known to those skilled in the art, a WWW server may also include facilities for storing and transmitting application programs, such as application programs written in the JAVA® programming language from Sun Microsystems, for execution on a remote computer. Likewise, a WWW server may also include facilities for executing scripts and other application programs on the WWW server itself.

A consumer or other remote consumer may retrieve hypertext documents from the WWW via a WWW browser application program. A WWW browser, such as Netscape's NAVIGATOR® D or Microsoft's Internet Explorer, is a software application program for providing a graphical consumer interface to the WWW. Upon request from the consumer via the WWW browser, the WWW browser accesses and retrieves the desired hypertext document from the appropriate WWW server using the URL for the document and a protocol known as HyperText Transfer Protocol ("HTTP"). HTTP is a higher-level protocol than TCP/IP and is designed specifically for the requirements of the WWW. It is used on top of TCP/IP to transfer hypertext documents between servers and clients. The WWW browser may also retrieve application programs from the WWW server, such as JAVA applets, for execution on the client computer.

Referring again to FIG. 26, the mass memory 1106 and operating program 1108 of computing device 1004 are capable of supporting a printing module 1010 that allows 1) retrieval of a colorized music score data file created according to the colorization, and, optionally, the linearization routines, as further described below; and 2) output of the related image to a color display monitor 1012 for image preview and adjustment of printer specific settings, and to a supported printer 1014 such that colorized sheet music can be printed 1016. The printing module 1010 also may support printing to a file for outside bureau printing. Alternatively, the image output from the computing device 1004 may be to a display module 1018 including a color keyboard screen display unit 1020 situated in relation to a keyboard musical instrument so that a keyboard user may play the colorized score by directly viewing the display unit 1020 without the aid of the colorized sheet music, and to stand alone orchestra display units 1026 which also allow users to play the colorized score on a musical instrument by directly viewing the stand alone display unit. To facilitate the playing of the colorized score, the system illustrated by FIG. 26 includes colored musical instrument templates such as plastic overlays 1022, suitable for a standard keyboard instrument with 88 keys, such as a piano, or modified to accommodate other musical instruments 1028. These overlays 1022 contain color indicators that correlate with the unique colors and patterns of the colorized musical scores created according to the colorization, and, optionally, the linearization routines illustrated by FIGS. 29–33, as further described below, to facilitate the playing of music. A further embodiment of colored templates can be provided by an illumination source which projects a suitable light and pattern on the keyboard.

The conversion of black and white sheet music into colored sheet music is preferably carried out by a system having a scanner 1002, a computer device 1004, and a high resolution color printer 1014. The present invention provides a computer software program to convert the musical score to a digital format. In block 1000, input in the form of a black and white musical score is provided to the scanner 1002. The scanner processes the data to a computer 1004, which executes a sequence of steps to colorize the black and white score into a colored score. The method is described in further detail below. The computer sends data to a printer 1014, which can provide an output 1016, which takes the form of a colorized version of the black and white musical score using the master color matrices of Tables A or B above. After conversion of the black and white sheet music into colored sheet music, the computer may store the information as in its memory and on a disk, tape, CD or other electronic media. The file can then be sent either to a display monitor 1018 or the file may be sent via a communication system, such as the Internet 1008, to various end users.

Figure 29:
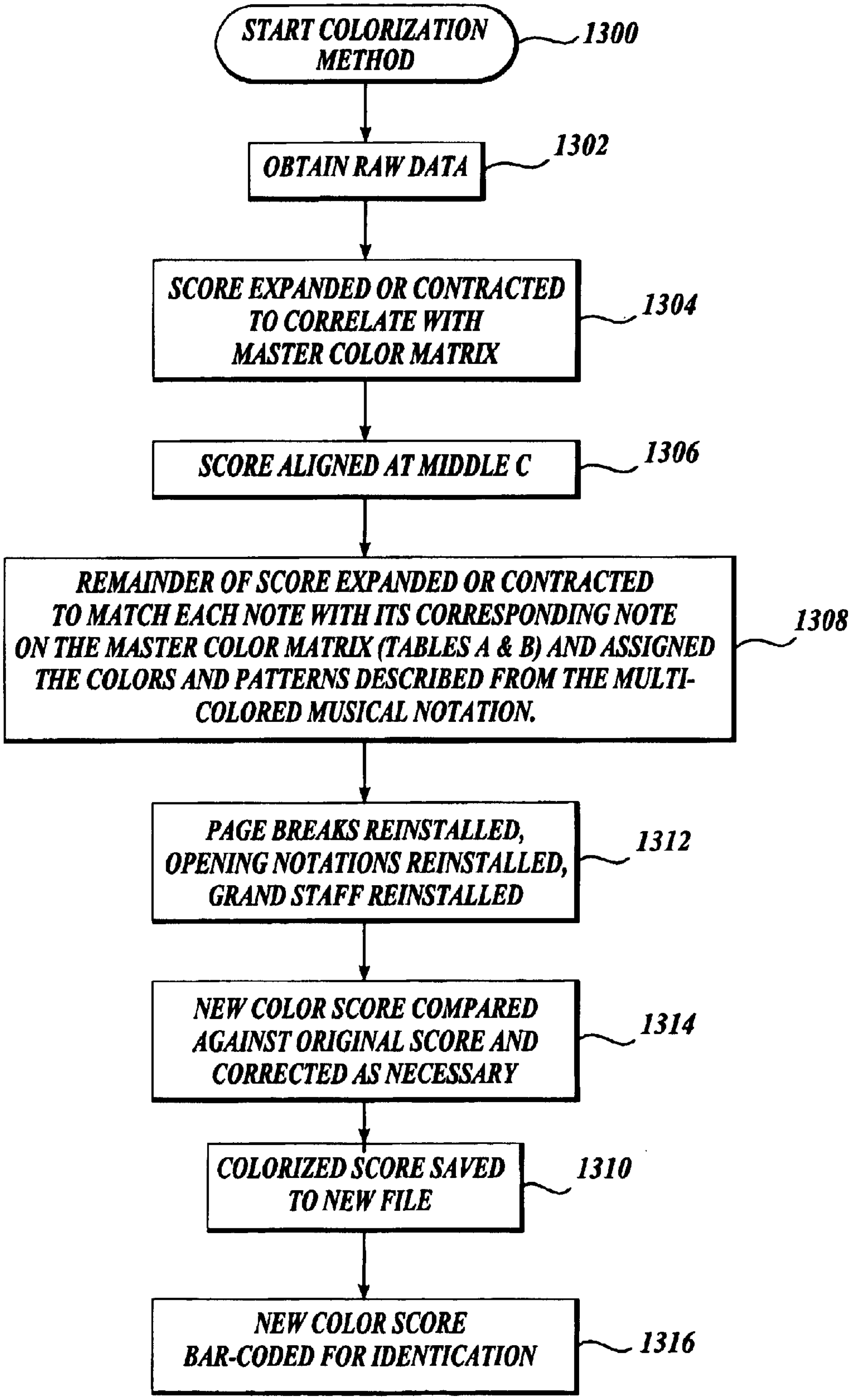
FIG. 29 is a block diagram of a colorization method according to the present invention.

Referring to FIG. 29, the present invention carries out a method of converting black and white musical scores into colorized musical scores using the foregoing system apparatus to execute the following steps. In block 1300, the colorization method is initiated. In block 1302, raw data in the form of a black and white music score is obtained. Block 1304 is a step for obtaining a master color matrix and then creating a grid according to Tables A and B above containing a vertical axis y with, preferably 88 rows to match each key on a standard piano keyboard. The horizontal axis x of the grid is then divided into sufficient vertical columns for each note, or chord, in a score thereby creating cells defined by the foregoing x and y components.

An example of a grid having master color matrix colors of Table B is illustrated in FIG. 30, wherein reference numeral 1400 represents a portion of a Grand staff of a musical composition to be converted into colorized music score using the master color matrices of Tables A or B. While FIG. 30 shows the colors selected from Table B, it is to be appreciated that any color scheme selected from the master color matrix of Table A is also suitable. Reference numeral 1402 points to a first column of notes, and reference numeral 1404 points to a second column of notes, to be colorized according to the present invention. Referring still to FIG. 30, reference numeral 1406 points to a column representing the keys of a musical instrument. Reference numeral 1416 points to a row for a half tone, and 1418 points to a row for a whole tone. Reference numeral 1408 provides information, such as the key letter corresponding to the key number 1406. Reference numeral 1410 points to the color selected according to Tables A or B for the whole tones, while reference numeral 1412 points to the first color of a half tone selected from Table A or B, and reference numeral 1414 points to the second color of a half tone selected from Table A or B. It should be readily apparent that columns 1410, 1412, and 1414 can include any color selected from Table A, as well, provided it corresponds to the key letter 1408.

Referring again to FIG. 29, in block 1306, a step is provided for aligning each line of the musical score at middle C, 1420, and expanding and/or contracting it such that that each note, or chord, in all the musical measures of each line can be matched with a corresponding column 1402 and 1404 to record note colors and patterns according to the colored musical notation system described above. In block 1310, a step is provided for scrolling the score across the grid such that each time a note appears in cells 1422, 1424, 1426 and 1428, the note will be color-coded using the colors and patterns described by the colored musical notation system of the present invention. In block 1310, a step is provided for saving this color and pattern information and then reproducing the score in a colorized version format, in either print or electronic display. In block 1312, a step is provided for reinstalling page breaks and opening notations 1430 at the beginning of each Grand staff 1400 as necessary. In block 1314, a step is provided for comparing the new color score to the original black and white score and making any necessary corrections. In block 1316, a step is provided for saving the resulting output and bar coding it to identify the specific work. The conversion method illustrated by FIGS. 29–30 may be accomplished preferably, by a computing device 1004, as shown in FIG. 26, capable of executing computer readable instructions from a computer readable medium to perform the method.

The method for colorizing black and white sheet music will be further described with reference to the embodiment of FIG. 30. A master color matrix is obtained from Tables A and B above, and correlated to a grid with and x and y axis as described above. Such a grid, illustrated schematically in FIG. 30 is then used to control the assignment of colors and patterns to the musical notes in musical scores. A single color or a binary set of colors is assigned to each musical note, respectively, for whole and half tones. A portion of a Grand staff including bass and treble clefs with notes 1400 is shown on the upper right corner of the grid in FIG. 30. For the first column 1402, two half notes are shown. The first higher note on the bass clef is a C note, and is therefore converted to a yellow colored note as described in the above section for the colored musical system 1422. A second lower note on the bass clef is also a C note, and is also colored yellow 1424. For the second column 1404, a G and an E note are both represented on a treble clef; therefore, these notes are designated to be colored purple and orange 1426 and 1428, respectively. It should be apparent that the colors shown in FIG. 30 are of one of multiple colored embodiments of the present invention. The master color matrix shown in FIG. 30 is a representation of the matrix from Table B, above. It also should be apparent that the master color matrix can include any color for the corresponding notes according to Table A. Finally, the grid utilized can include more or less than 88 rows depending upon the type of musical score being colorized.

Figure 31:
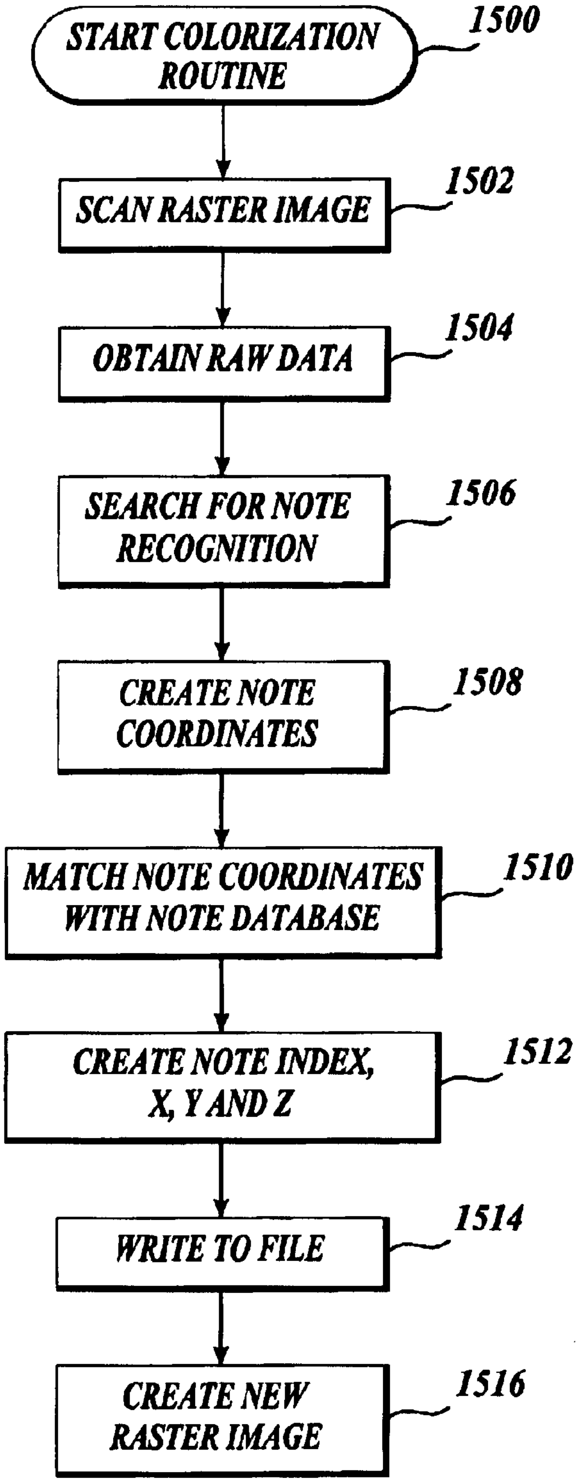
FIG. 31 is a block diagram of a colorization routine implementable on a computer system according to the present invention.

FIG. 31 illustrates one colorization routine suitable for implementation by the computing device 1004 of FIG. 26. As illustrated by FIG. 31, block 1500, black and white sheet music is a raster image that is scanned by the scanning engine 1002 of FIG. 26. The resulting raw data comprising digital signals block 1502, FIG. 31, is transferred to the computing device 1004 of FIG. 26. The computing device 1004 then utilizes stored computer readable instructions to search for note recognition in block 1506, FIG. 31, create note coordinates 1508 for each note, match note coordinates with corresponding notes in database 1510, create a new note index for the scanned image consisting of x and y coordinates and a z component comprised of a color and pattern designation according to the master color matrix of the colored musical notation system 1512 described above for all notes, save the new note indices for the entire scanned score to a new file 1514, reproduce a new raster image consisting of colored music for printing, display or electronic transmission 1516. Alternately, the foregoing routine can be executed using digital information obtained from sources other than the scanning engine 1002 of FIG. 26, including sources of digital music such as MIDI files obtainable via a communication network, such as the Internet or downloadable from a CD. Optionally, the colorization routine illustrated by FIG. 31 can also include the linearization routine illustrated by FIG. 33 and as further described below. The data output of the colorization routine in FIG. 31 can be used to create a library of electronic files of colored musical scores which can be permanently saved to a computer disk, or other electronic media. The data can be either reproduced for distribution to music stores or other outlets as compact disks, or other electronic media, or transmitted from the library to an end user via a communication system, such as the Internet. The data files may then be downloaded from the communication system such as the Internet, or from a compact disk, into the end user's computing device such as the computing device 1004 of FIG. 26. Once the colored music data file is in the computing device of the end user, the colorized music score music can be printed 1010, FIG. 26, or displayed by placing the computer monitor near the musician, such as on top of a piano, or, further transmitted to laptop computing devices placed in front of a musician and to remote screens including specialized display units 1032 and 1034, FIG. 26, and, optionally, to a specially designed linear music display screen 804, FIG. 23. Optionally, to prevent the unauthorized reproduction of both the method for producing colored musical scores, and the colored musical scores, compact disks and other computer readable media may include features which inhibit reproduction beyond one back-up copy. Similarly, colored musical scores created according to the present invention may be printed using standard industry techniques to inhibit unauthorized reproduction by photocopiers.

Figure 32:
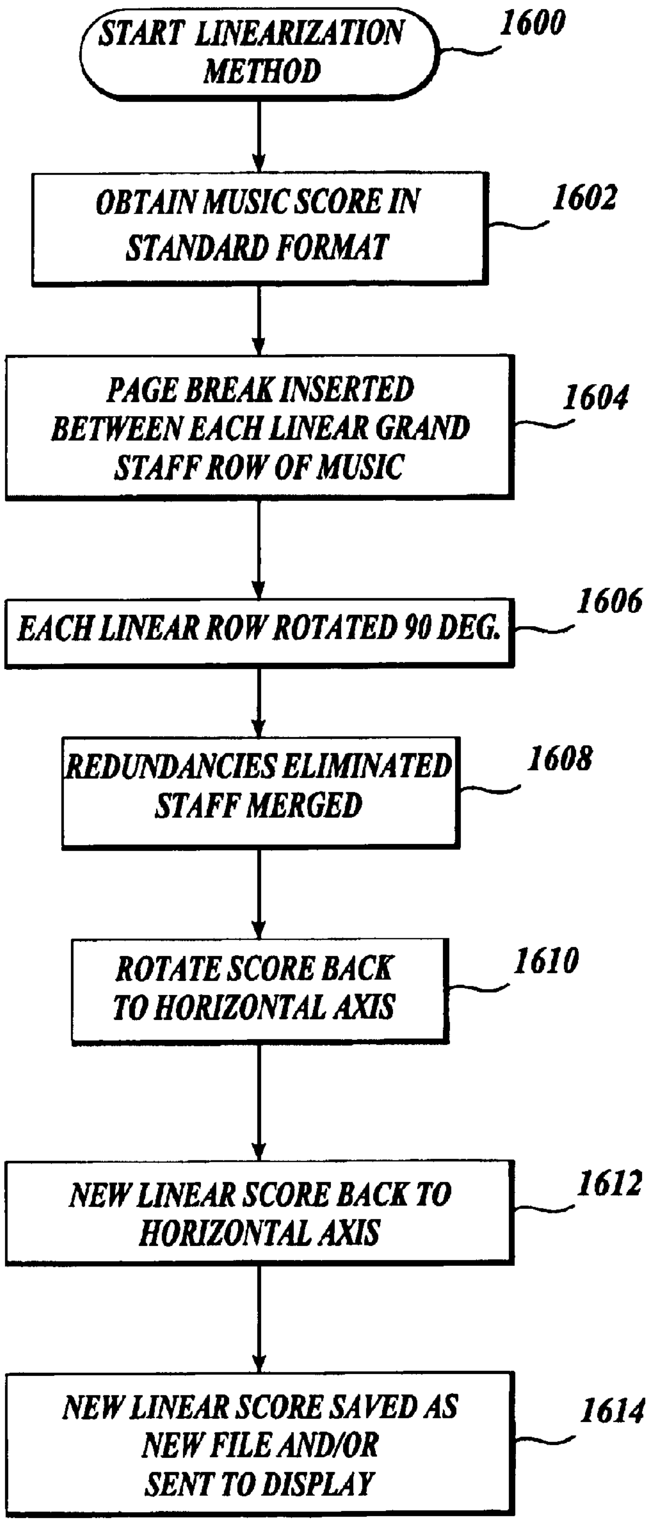
FIG. 32 is a block diagram of a linearization method according to the present invention.

As illustrated by FIG. 32, the present invention includes a method for converting music scores from the standard "book" format to a linear format. In the linear format there will be no break at the end of a Grand staff line of music as occurs in a standard "book" format. Instead, one long continuous line of music will exist. This linear format has a number of advantages including facilitating uninterrupted eye contact with the notes being played.

Referring to FIG. 32, the method of converting standard music scores to a linear format has one or more of the following steps. In block 1600, the start of the linearization method, a black and white or colorized music score is obtained, 1602. In block 1604, a page break is inserted between each horizontal Grand staff row of music. In block 1606, each linear row is rotated 90 degrees. In block 1608, redundancies are eliminated, such as duplicate key signatures, for merging all staffs end to end. In block 1610, the score is rotated back to a horizontal axis. In block 1612, the new linear score is completed on the horizontal axis, and in block 1614, the resulting output is saved and bar coded it to identify the specific work. This method can be performed manually, but the preferred way of implementing the method is by using a computing device 1004, as shown in FIG. 26, capable of executing computer readable instructions to perform the method.

Figure 33:
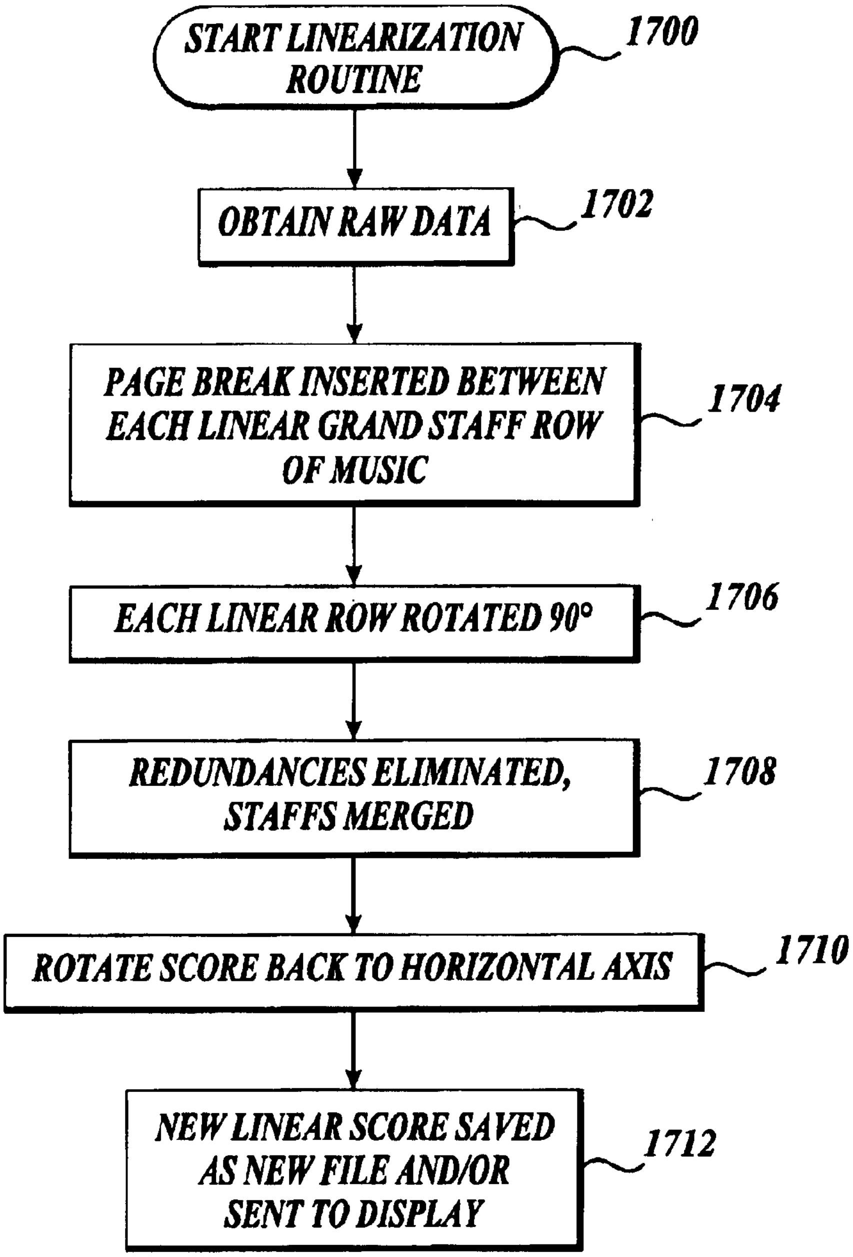
FIG. 33 is a block diagram of a linearization routine implementable on a computer system according to the present invention.
Figure 34:
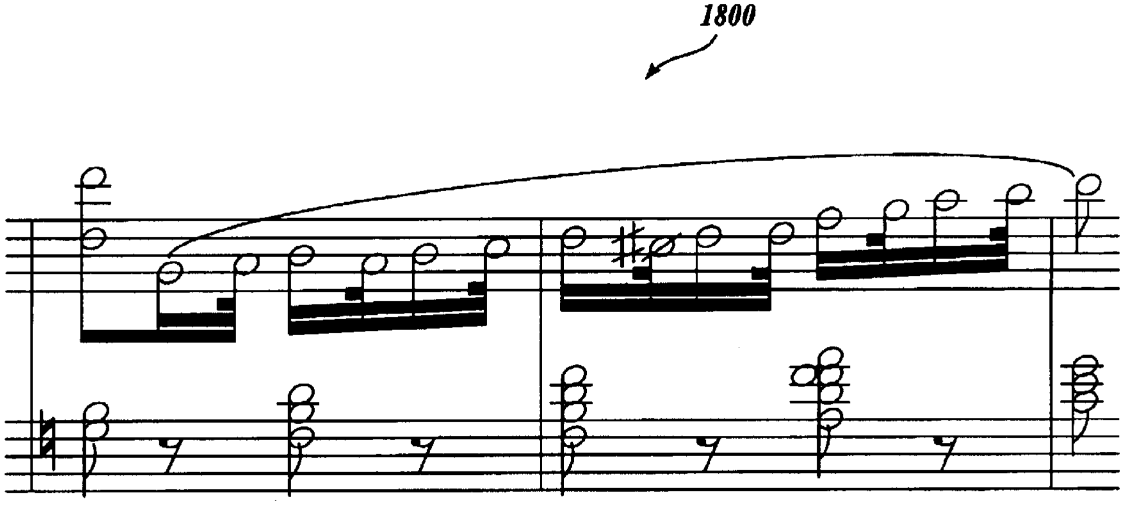
FIG. 34 is a schematic illustration of a colorized musical score product made according to the present invention.

FIG. 33 schematically illustrates linearization routine suitable for implementation by the computing device 1004 of FIG. 26. As illustrated by FIG. 33, raw data consisting of digital signals obtained by scanning black and white sheet music using the scanning engine 1002 of FIG. 26, or, alternatively, digital information obtained from other sources including previously digitized music such as MIDI files, is transferred to the computing device 1004 of FIG. 26. The computing device 1004 then utilizes stored computer readable instructions to: insert a page break between each horizontal grand staff row of music, block 1704, rotate each linear grand staff row of music 90 degrees, block 1706, eliminate redundancies, such as duplicate key signatures and merge all staffs, block 1708, rotate the score back to a horizontal axis, block 1710, and save the resulting data to a new file for printing, display or electronic transmission, block 1712. A music score product made by the foregoing colorization method is illustrated in FIG. 34.

While the preferred embodiment of the present invention has been illustrated and described, it will be appreciated that various changes can be made thereto without departing from the spirit and scope of the invention.

The embodiments of the invention in which an exclusive property or privilege is claimed are defined as follows:

1. A method for colorizing musical scores having black and white notes into musical scores having colored and patterned notes, comprising;

(a) obtaining a first data structure, wherein the first data structure includes a plurality of note fields, each note field containing at least one black and white note;

(b) obtaining a second data structure, wherein the second data structure includes a note field containing notes corresponding to notes in the first data structure, a color field having a color corresponding with each note in the note field of the second data structure, and a pattern field having a pattern corresponding with each note in the note field of the second data structure;

(c) matching each black and white note in the first data structure with a note from the note field in the second data structure and assigning the color and pattern corresponding with the note to create a plurality of colorized and patterned notes from black and white notes; and (d) creating a third data structure, wherein the third data structure includes a plurality of note fields having the colorized and patterned notes arranged in a musical score wherein the first and the second data structure further includes an octave field having a plurality of octaves, and wherein each note in the first and second data structure is assigned to one of the octaves.

2. The method of claim 1, further comprising scanning a musical score having black and white notes to obtain the first data structure.

3. The method of claim 1, wherein the musical scores having black and white notes are in digital format.

4. A method for transferring a computer program product from a first computer to a second computer connected to the first computer through a communications medium, comprising:

(a) accessing on a first computer, computer executable instructions for execution by a computer, the computer executable instructions for performing the method for colorizing musical scores having black and white notes into musical scores having colored and patterned notes, comprising:

(a) obtaining a first data structure, wherein the first data structure includes a plurality of note fields, each note field containing at least one black and white note;

(b) obtaining a second data structure, wherein the second data structure includes a note field containing notes corresponding to notes in the first data structure, a color field having a color corresponding with each note in the note field of the second data structure, and a pattern field having a pattern corresponding with each note in the note field of the second data structure;

(c) matching each black and white note in the first data structure with a note from the note field in the second data structure and assigning the color and pattern corresponding with the note to create a plurality of colorized and patterned notes from black and white notes; and (d) creating a third data structure, wherein the third data structure includes a plurality of note fields having the colorized and patterned notes arranged in a musical score; and (b) transferring the computer executable instructions from the first computer to the second computer.

5. The method of claim 4, wherein the musical scores having black and white notes are in digital format.

6. A method for converting musical scores having black and white notes into musical scores having colorized notes, comprising:

(a) scanning an image of a musical score having black and white notes to obtain raw data representing the musical score having black and white notes;

(b) searching for recognition of the black and white notes in a database having notes corresponding to the black and white notes, wherein the notes in the database are assigned coordinates or digital instructions and a color and pattern from a master color matrix having a color and a pattern for each note in the database;

(c) creating coordinates or digital instructions for each black and white note;

(d) matching the black and white note coordinates or digital instructions with the coordinates or digital instructions of the notes in the database;

(e) creating an index comprising the coordinates or digital instructions of the notes in the database that have been matched with the black and white note coordinates or digital instructions and assigning the color and pattern according to the master color matrix;

(f) saving the index as data in a file; and (g) generating an image of a musical score having colorized and patterned notes from the data.

* * * * *